Sept. 5, 1944.   J. W. BRYCE   2,357,455
ACCOUNTING MACHINE
Filed Oct. 30, 1940   9 Sheets-Sheet 1

INVENTOR.
James W. Bryce
BY
ATTORNEY.

BEST AVAILABLE COPY

Sept. 5, 1944. J. W. BRYCE 2,357,455
ACCOUNTING MACHINE
Filed Oct. 30, 1940 9 Sheets-Sheet 2

INVENTOR.
James W. Bryce
BY
ATTORNEY.

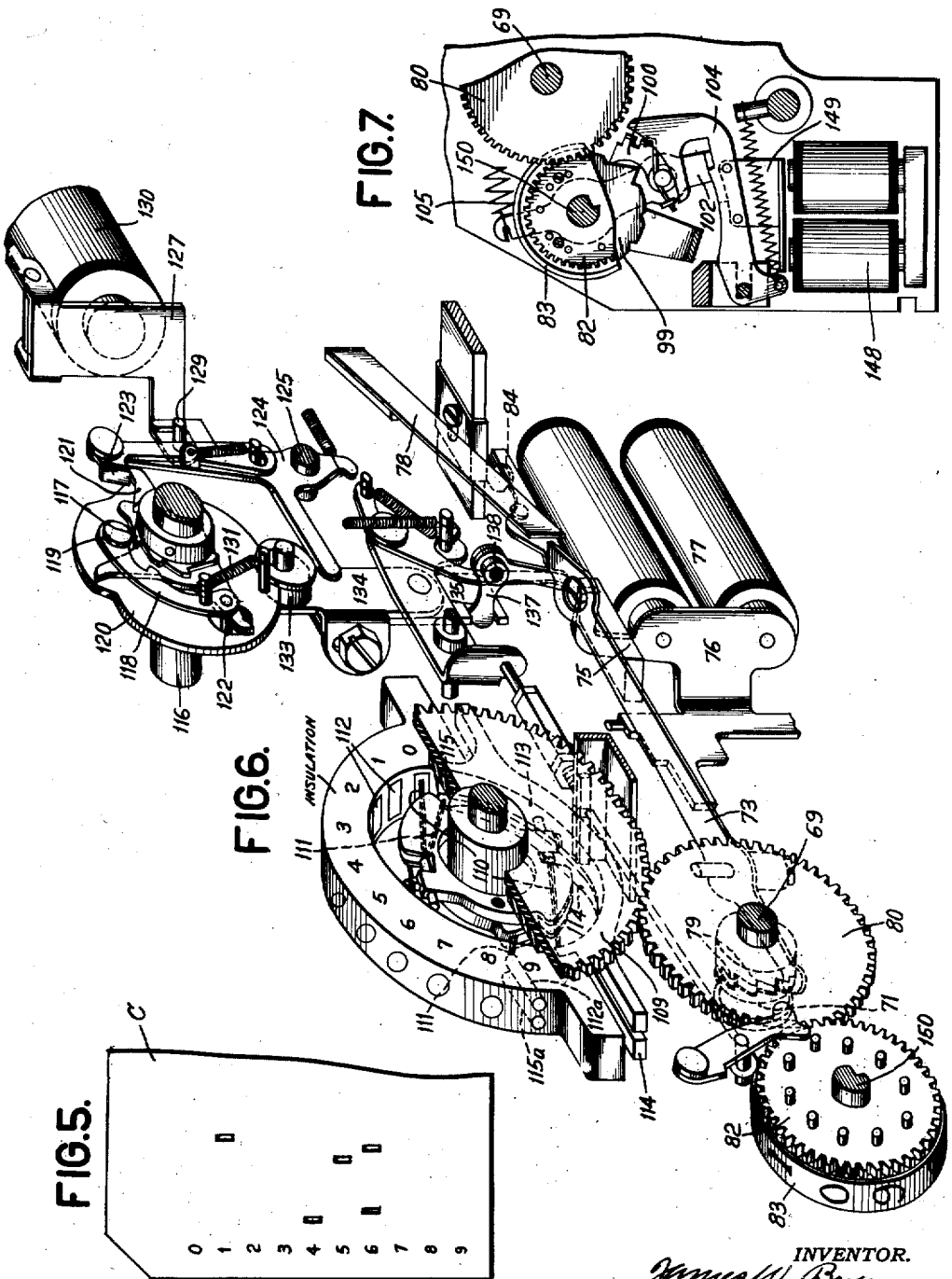

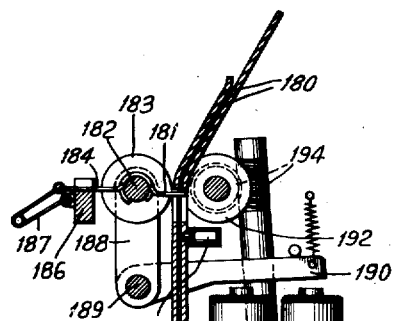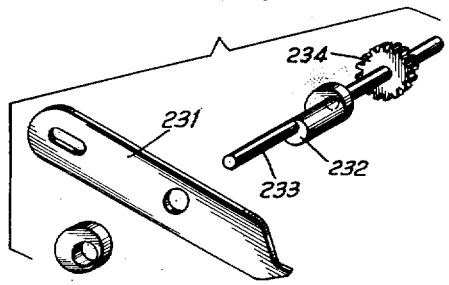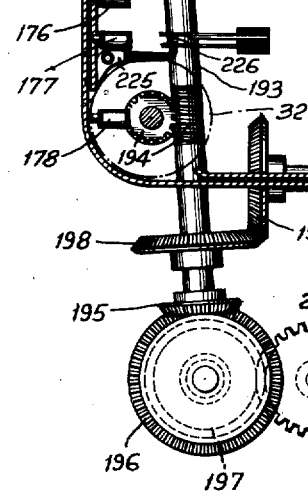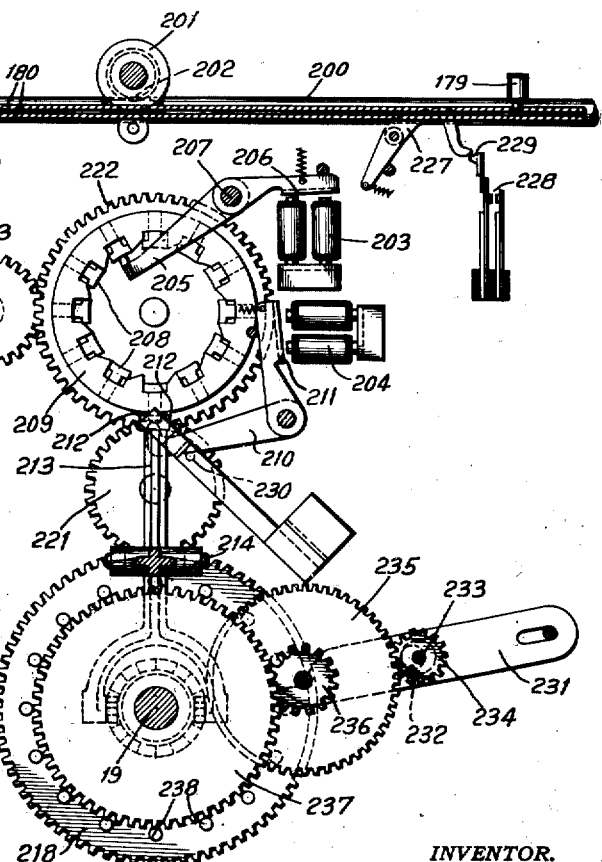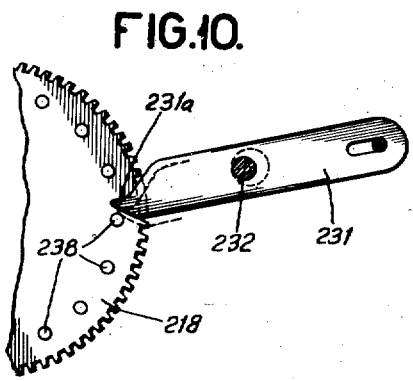

Sept. 5, 1944.   J. W. BRYCE   2,357,455
ACCOUNTING MACHINE
Filed Oct. 30, 1940   9 Sheets-Sheet 6
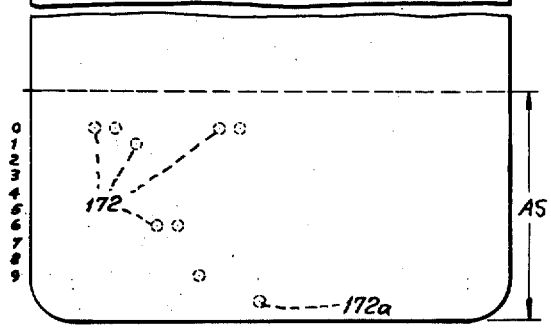
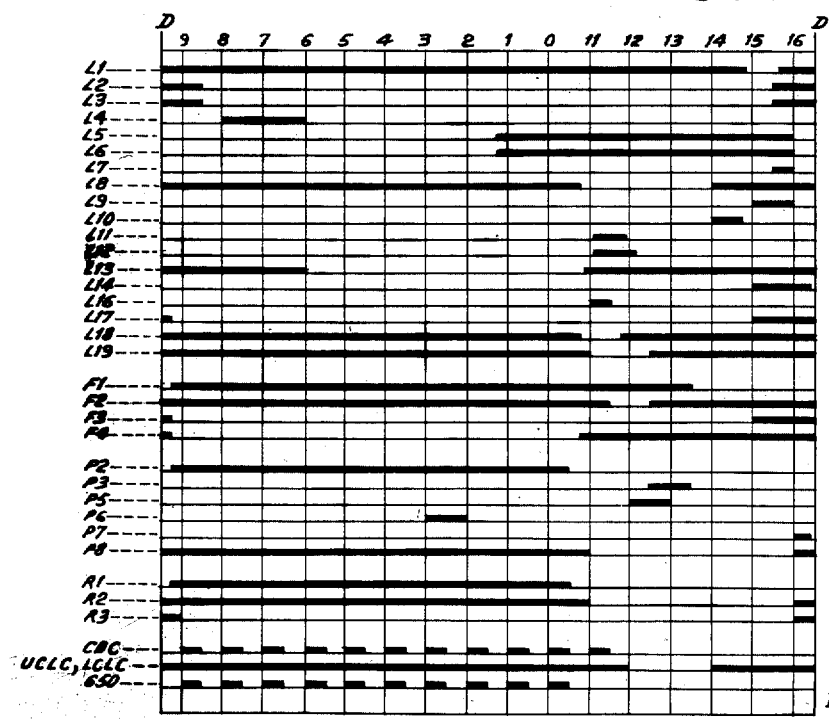
BY *James W. Bryce*
   *W. M....*
   ATTORNEY.

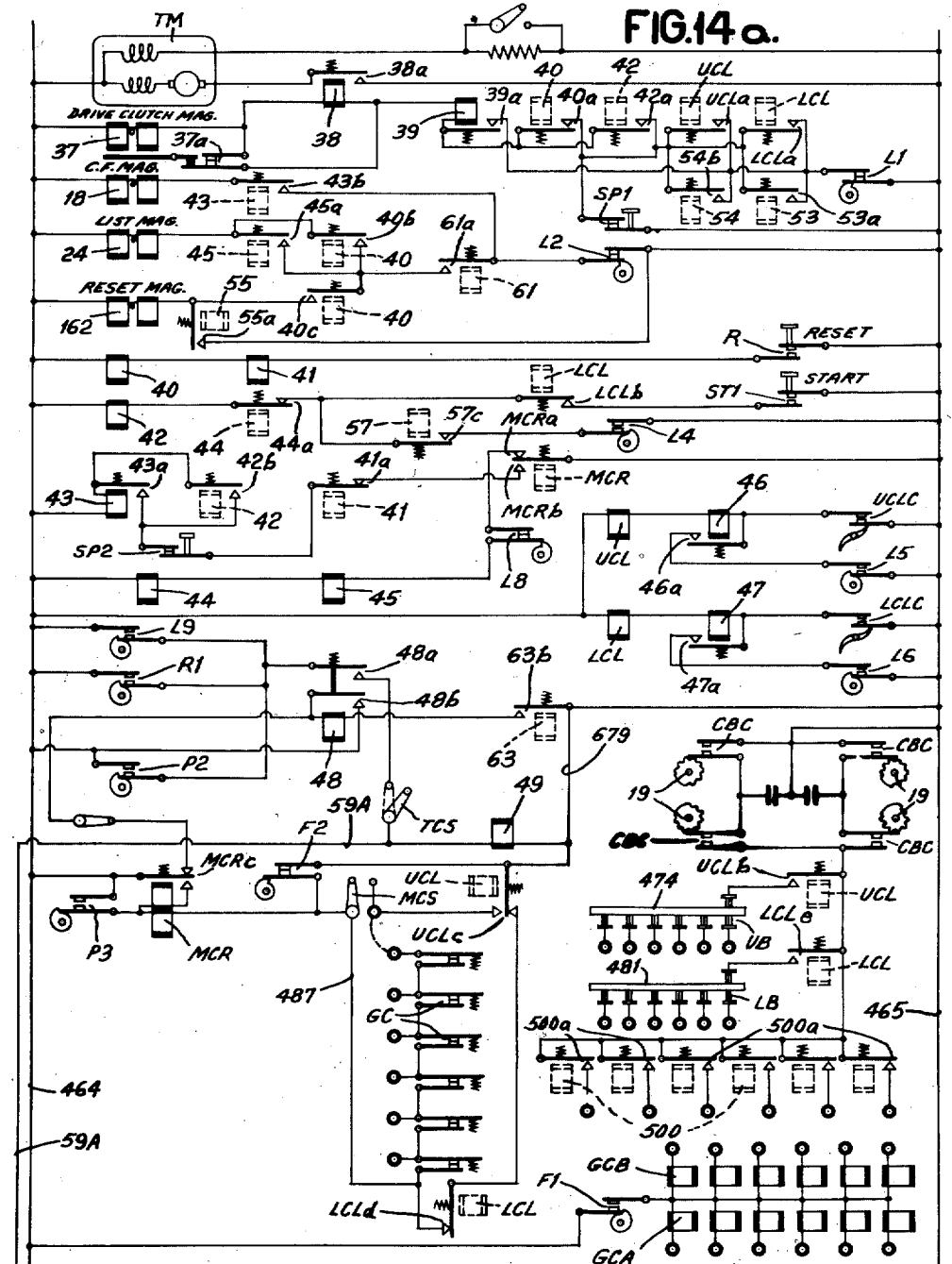

Patented Sept. 5, 1944

2,357,455

UNITED STATES PATENT OFFICE 2,357,455

ACCOUNTING MACHINE

James W. Bryce, Glen Ridge, N. J., assignor to International Business Machines Corporation, New York, N. Y., a corporation of New York Application October 30, 1940, Serial No. 363,509

7 Claims. (Cl. 235—61.9)

This invention relates broadly to accounting machines employing balance recording and reading devices, and more specifically to balance entering mechanism coordinated with automatic ledger sheet feeding control, so that balance amounts may be represented in code on a ledger sheet, and sensed thereon as the sheet reaches a posting position, and thereby entered into an accumulator in which other items are added from individual records for the formation of a new balance.

An object of the present invention resides in the provision of means for printing numerically on the ledger sheet new balances, and thereafter recording in code that said new balances in a predetermined area on the ledger sheet so that the sheet may be analyzed later when reinserted for controlling suitable balance deriving means.

Another object of the present invention resides in the provision of means in combination with a ledger posting machine for recording the balance amounts in code so that upon reinsertion in the machine the said code representations can be obliterated and replaced by similar code repersentations designating a new balance.

Another object of the present invention resides in the provision of means for printing numerically on the ledger sheet new balances derived from the accumulator, and thereafter recording magnetically in code the said new balances so that the sheet may be analyzed later when reinserted for the adition or subtraction of additional items.

Another object of the present invention resides in the provision of means for obliterating the previous code balances recorded magnetically on the ledger sheets when reinserted in the machine and recording magnetically thereon the new balances derived from the accumulator.

Another object of the present invention resides in the provision of means for automatically coordinating balance printing, reading, obliterating and accumulating mechanisms with ledger sheet feeding means. The mechanisms are incorporated in a record controlled machine wherein the records are arranged in groups, and group control devices detect changes in group designations on the records. After the entry of the last item associated with a certain ledger account, a group change is detected, a total printing cycle is initiated, and the ledger sheet is ejected. Before ejection, the total or balance amount is printed numerically, and provision is made for recording at the same time a marginal magnetic designation on the ledger sheet for indicating the position of the last printed line which designation is utilized, upon reinsertion thereof, for causing the ledger sheet to be brought into proper posting position. Upon completion of each printing or posting operation, control means are automatically rendered effective to cause the advancement of the ledger sheet so that the new balance may be recorded magnetically in code in a predetermined area on the said sheet. Upon reinsertion of the ledger sheet the recorded balance formed thereon is analyzed and entered in the balance accumulator (before item entries from the records are effected), and then obliterated before balance accumulating, printing, and magnetic code recording operations are effected.

Another object of the present invention resides in the provision of means for recording magnetically the balances in code, at all times, in the same predetermined area on the ledger sheet.

Still another object of the present invention resides in the provision of means for preventing resetting operations to occur immediately following the printing operations, and rendering the reset means operative after predetermined ledger sheet feeding operations and readout operations from the accumulator to effect magnetic recording in code of the new balance set up therein.

Other objects of the invention will be pointed out in the following description and claims and illustrated in the accompanying drawings, which disclose, by way of example, the principle of the invention and the best mode, which has been contemplated, of applying that principle.

In the drawings:

Fig. 5 shows a portion of a perforated record card.

Fig. 6 is a perspective view of a representative portion of the adding and subtracting mechanism of the accumulator.

Fig. 7 is an elevation view of the elusive one unit entry device of the accumulator.

Fig. 8 is a sectional view showing the ledger sheet feeding mechanism and control devices therefor, and including the various reading and recording magnets associated therewith.

Figs. 10 and 10a are detailed views of a homing device employed in the ledger sheet feeding mechanism.

Fig. 11 is a plan view of the magnetic ledger sheet.

Fig. 12 is a sectional view of the ledger sheet.

Fig. 13 is a timing diagram of various control elements of the machine.

Figure 14B:
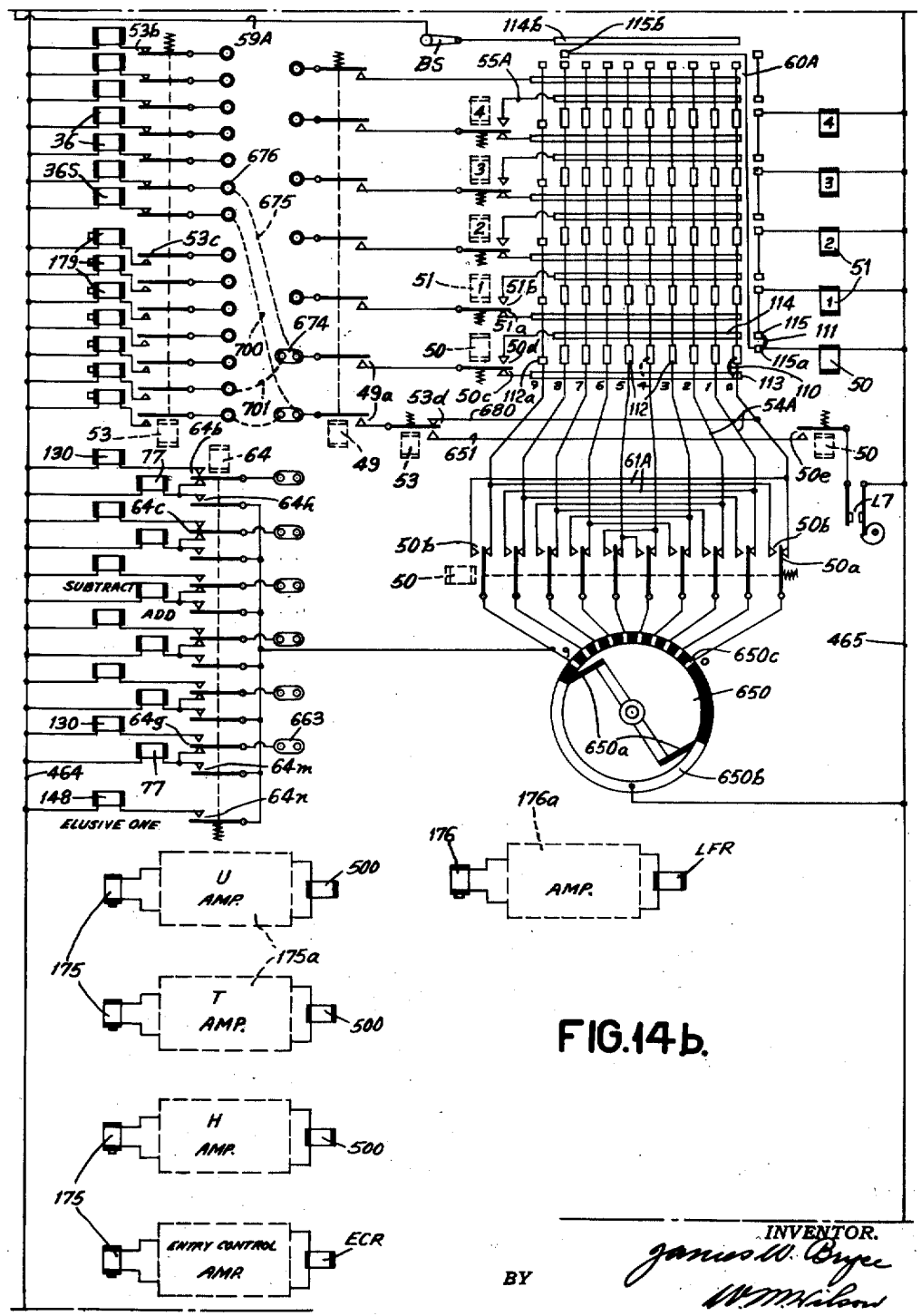
Figure 14C:
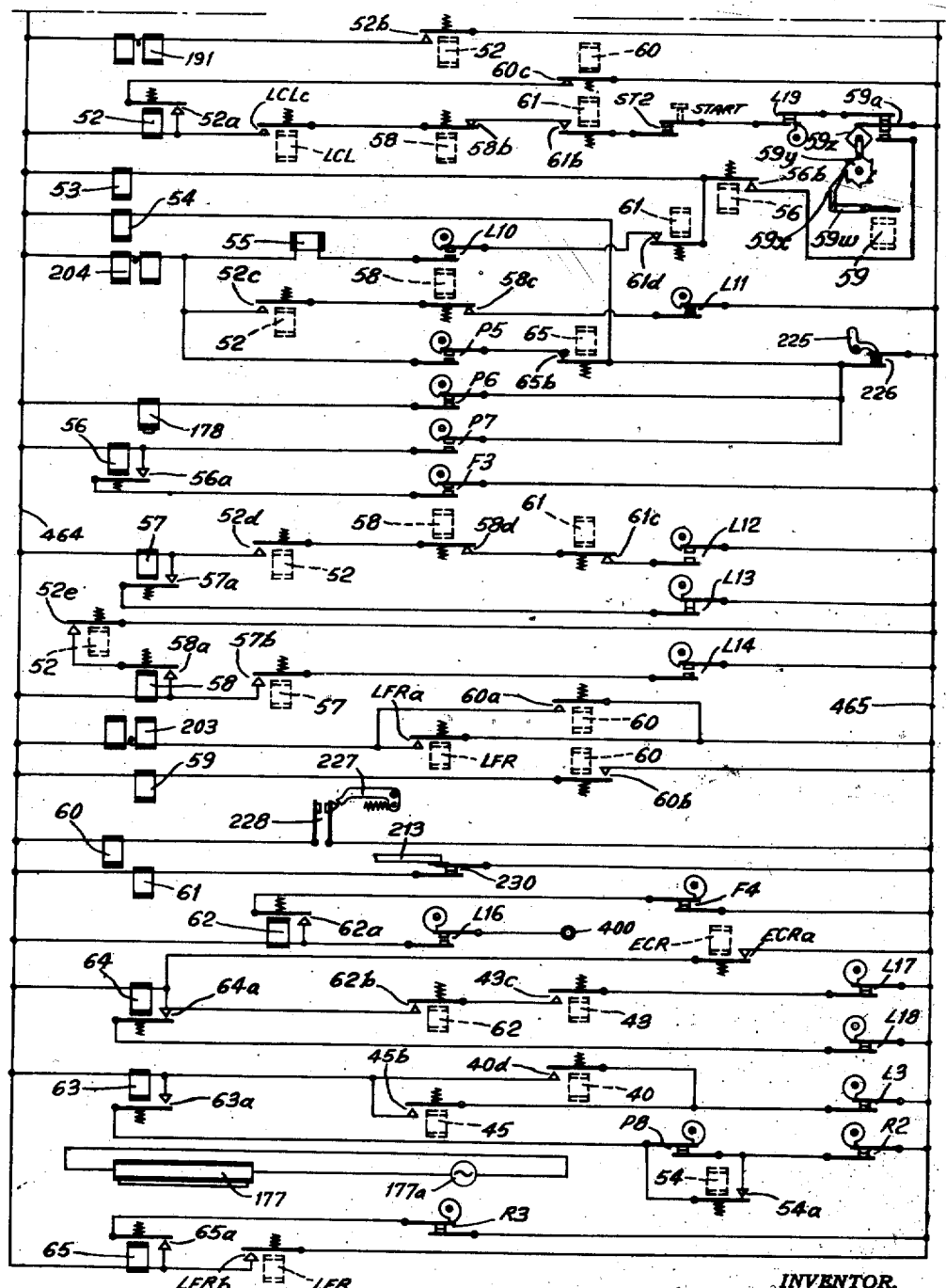

Figs. 14a to 14c together form a wiring diagram of the electrical controls of the machine.

The balance printing and magnetic recording devices, the magnetic reading devices, and the accumulating controls of the present invention are coordinated with a novel ledger sheet posting control mechanism and all of said devices are incorporated in a tabulating machine of the kind disclosed in U. S. Patent No. 2,126,621. The machine is designed to sense the data representations on perforated record cards, and add the numerical data thereof. The cards are arranged in groups according to group numbers perforated therein, and the machine is set for tabulating control, so that a record is printed of the total amounts of the groups. Each group number usually corresponds with, or relates to, some ledger number which identifies an account. The tabulating machine exercises control over operation of the ledger posting sheet feeding devices through the group control devices. The starting of card feed operations is delayed automatically until initial ledger sheet feeding and reading operations are effected. Upon entry of the old balance in the accumulator the code recordings thereof are obliterated on the ledger sheet. After a control break, printing of the new balance is effected, followed by positioning of the ledger sheet to a common reference point, before a magnetic recording in code of the new balance is made. Resetting of the baalnce accumulator is prevented until the code recording operations mentioned have been completed. Additional novel controls and interlocks between the said devices are described hereinafter.

Before describing the ledger posting operations, it is deemed advisable to describe the various mechanisms employed in the machine and the purposes thereof, so that the coordination of the balance entry and recording mechanisms therewith may be more readily understood.

The tabulating machine of U. S. Patent No. 2,126,621 to which the features of the present invention are applied is similar in most respects to the machine shown in U. S. Patent No. 1,976,617, issued October 9, 1934. This latter patent illustrates and explains in more extensive detail the manner of organization and mode of operation of the various units of a well known type of tabulating machine. In the present machine the reset motor RM of the Lake and Daly machine is omitted and the resetting mechanism is driven from the main driving motor, known as the tabulating motor, to thus constitute a single motor machine. In the present application, these mechanisms will be explained in only as much detail as will be necessary to explain the manner in which the objects of the invention may be realized.

*Card feeding mechanism*

Figure 1:
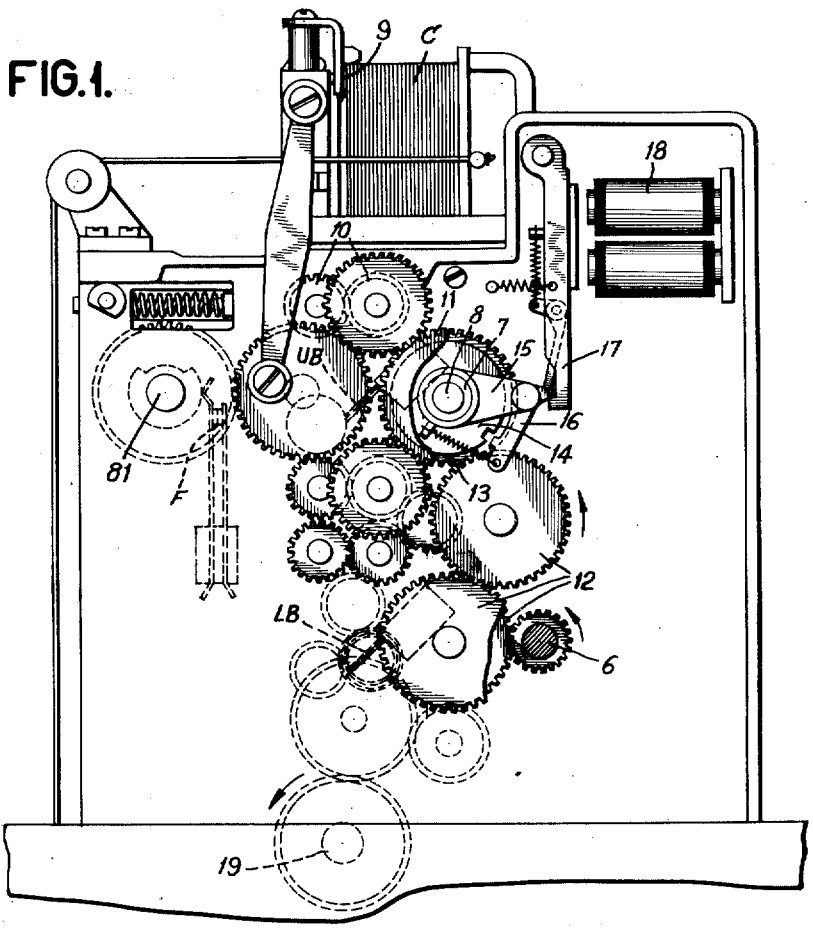
Fig. 1 is a side elevation view of the card feeding and analyzing mechanism showing the card feed declutching devices.

The card feeding mechanism shown in Fig. 1 is similar to the usual feed devices except that provision is made in the form of a clutching device for interrupting the card feeding operations without stopping the accumulating drive mechanism. The card analyzing brushes are indicated at UB and LB, and the record cards C are successively advanced by picker 9 to pairs of feed rollers 10, which serve to advance the cards past the upper and lower brushes in succession. The shafts upon which rollers 10 are mounted are provided with gears at their extremities and arranged as shown for operation by a main driving gear 11, which is freely mounted upon a shaft 8 and which has connection with an arm 15 through a sleeve 7. Arm 15 carries spring-pressed clutching dog 16 normally held in the position shown by an armature latch 17 which is controlled by the clutch magnet 18. Between gear 11 and arm 15 are a gear 13 and a clutch driving disk 14 freely rotatable upon the sleeve 7 (said gear 13 being secured to the said clutch driving disk 14). Gear 13 has gear train connections generally designated 12 with the pulley shaft 6 which is in operation as long as the main driving motor is operative. Energization of magnet 18 will trip dog 16 into engagement with disk 14, and the card feeding mechanism will cause cards to be advanced past the brushes UB and LB, and feeding operations will continue as long as magnet 18 remains energized. During balance entry and total taking cycles of operation, magnet 18 is deenergized and card feeding will not take place during such cycles.

*Printing mechanism*

Figure 3:
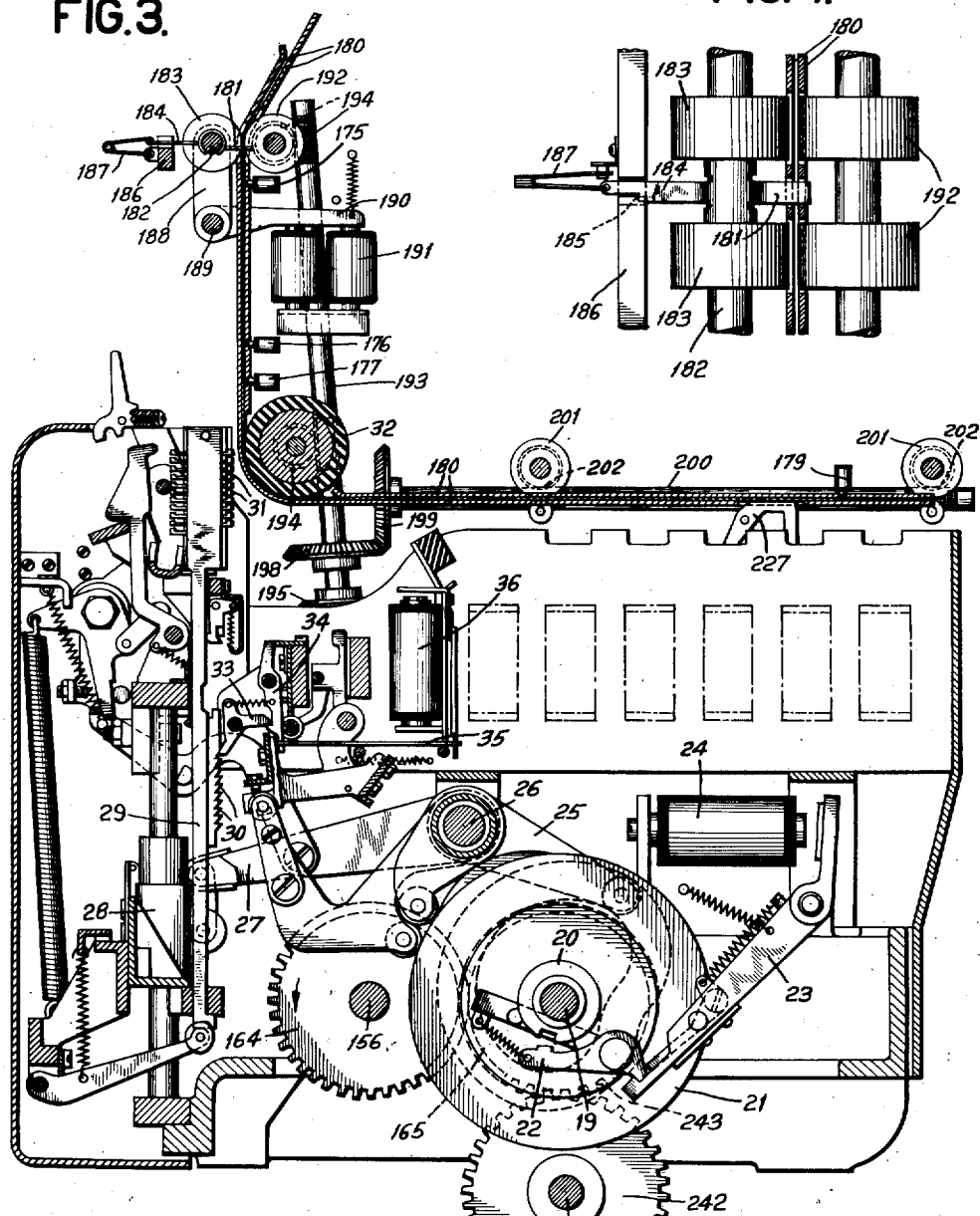
Fig. 3 is a central section of the essential elements of the printing mechanism, and showing in part the ledger sheet feeding mechanism and associated reading and recording magnets.

The printing mechanism is shown in Fig. 3 where the usual so-called listing shaft 19 carries a clutch driving element 20. Shaft 19 has direct driving connection with the constantly running shaft 6 (Fig. 1) so that clutch driving element 20 may rotate continuously. The listing cam 21 is freely carried on the shaft 19 and provided with a spring-pressed clutching dog 22 adapted for engagement with the driving element 20. Dog 22 is normally held out of engagement by arm 23 controlled by magnet 4. Energization of magnet 24 will permit cam 21 to rotate with the listing shaft 19, and follower arm 25 will cause oscillation of rocker shaft 26 to which are secured arms 27 link-connected to the reciprocating crosshead 28 so that for each revolution of cam 21, crosshead 28 will be moved upwardly and then down again to its initial position. Slidingly mounted in the crosshead are numeral type bars 29 spring urged into movement with the crosshead as it rises. As type bar 29 moves upwardly, ratchet teeth 30 successively pass the nose of a stopping pawl 33 as the digit type elements 31 successively pass the printing position opposite platen 32. Energization of printing control magnet 36 as the type bar moves upwardly, will draw call wire 35 toward the right to rock latch 34 out of engagement with stopping pawl 33 whereby the nose of the latter will engage one of the teeth 30 and interrupt further upward movement of the type bar. The upward movement of the type bar is synchronized with the movement of an impulse emitting device, which will be referred to later herein, to cause the magnet 36 to be energized to interrupt the type bar with the type element 31 corresponding to the value of the digit set up in suitable means associated with the impulse emitting device. Before the crosshead 28 moves downwardly, the usual printing hammers are tripped to take an impression from the selected type elements.

Cam 21 controls the movement of the crosshead 28 during the total taking operations. The provision of magnet 24 and associated cultching devices together with the controlling circuits, which will be described in connection with the circuit diagram, permit the use of cam 21 for such printing purposes.

Accumulating mechanism

The machine is provided with one or more accumulators for adding and subtracting the entered data values to secure the amount of positive or negative balances. In Fig. 6 is shown a perspective view disclosing a representative order of an accumulator with its number entering controls. A drive shaft 69 is directly geared to pulley shaft 6 of Fig. 1 so that it is in operation as long as the driving motor of the machine functions, and the driving ratio is such that shaft 69 makes one revolution for each card feeding cycle of the machine. Shaft 69 has slidably mounted thereon, but keyed for rotation therewith, a clutch element 71, one for each denominational order of the accumulator. The element 71 is provided with a groove into which fits the end of the short arm of a lever 73 which is pivoted as shown and provided with a block 75 normally abutting an armature latch 76 of adding magnet 77. A leaf spring 78 bears against the extremity of the longer arm of lever 73 and moves the same in a counterclockwise direction upon release of block 75 by armature 76. This movement will bring clutching member 71 into engagement with cooperating teeth 79 integral with a gear 80 loosely mounted on shaft 69. Gear 80, when thus coupled to shaft 69, will rotate a gear 82, which meshes therewith and will displace the accumulator index wheel 83.

The rearward extremity of lever 73 is adapted to be engaged by a finger 84 toward the end of the cycle for the purpose of disengaging clutch element 71 from teeth 79 and relatching block 75 on armature 76.

Briefly, summarizing the adding operation, the magnet 77 may be energized at various points in the cycle of the machine, depending upon the location of a perforation in a column of the record card C, Fig. 5, analyzed by the lower brushes LB. This energization may take place in response to a perforation in any of the index point positions from "9 to 1," inclusive. A perforation in the "9" index point position will trip the clutch element 71 nine steps before finger 84 is operated to de-clutch it; and a perforation in the "1" index point position will trip the clutch element 71 one step before it is de-clutched by the finger 84. Each step of clutching engagement corresponds to a tenth of a revolution of the accumulator index wheel 83 so that a "9" hole will move it nine-tenths of a revolution and a "1" hole will move it one-tenth of a revolution. The manner in which circuits through the lower brushes control the operation of magnet 77 will be set forth in connection with the explanation of the circuit diagram.

Carry mechanism

Each wheel 83 has associated therewith a carry cam 99, Fig. 7, which cooperates with a pawl 100 pivoted on a latch arm 102. When the wheel 83 passes through the zero position, a high tooth of the carry cam 99 will engage and rock down its pawl 100 which, through an extension thereon, presses down a latch 104 normally holding the arm 102 of the next higher order. When released, arm 102 is moved by spring 105 to operate pawl 100 and engage a tooth on cam 99 to turn the wheel one step.

Subtracting mechanism

In the operation of the subtracting accumulator, the entry of the nines complement of a number to be subtracted is effected by initially tripping all the adding magnets 77 as though to add nines in each position and causing the perforation in the record card to de-clutch the adding mechanism in accordance with the location of the perforation. This will result in the addition of the nines complement of the number. The elusive one is added into the units order of the accumulator independently to thereby change the nines complement to a tens complement. For example, if an "8" is to be subtracted in a particular order, the related adding magnet 77 is tripped at the "9" position in the cycle of the machine and the index wheel will commence to rotate. At the next index point position, which is "8," the perforation will, through the mechanism to be presently described, cause de-clutching of the mechanism after the index wheel 83 has turned through one step with the result that a "1" is added into the index wheel, representative of the nines complement of "8." The mechanism for effecting this de-clutching action will now be described. A shaft 116 is geared to the constantly rotating connections of the machine, the ratio being such that shaft 116 makes two revolutions for one revolution of shaft 69. Secured to shaft 116 is a clutch element 117, and cooperating with the element is a clutching dog 118 pivoted at 119 to a cam 120 freely mounted on shaft 116. Also freely mounted on the shaft is a triple-armed member 121, one of whose arms engages a pin 122 in the free end of dog 118 to hold the latter out of engagement with the driving element 117. Each of the arms of member 121 is adapted to cooperate in turn with a pawl 123, which is carried by clutch element 124 which is pivoted at 125. The pawl 123 is resiliently mounted on element 124 through a spring and pin connection. A magnet armature 127 having a pin 129 in a laterally extending arm thereof, is adapted, upon energization of a subtracting magnet 130, to rock element 124 in a clockwise direction to release member 121 thereby permitting spring 131 to rock the member in a counterclockwise direction, and at the same time permit the engagement of dog 118 with the driving element 117. The cam 120 will thus be driven in a counterclockwise direction until the next arm of member 121 is engaged by pawl 123, which then causes disengagement of the clutch and interruption of further movement of the cam. The cam 120 is provided with three notches about its periphery, into which a roller 133 rises successively.

Upon the initial movement of cam 120, the higher, concentric portion of the cam will depress roller 133 and with it slider 134 upon which the roller is pivoted. Slider 134 has adjustably connected thereto another slider 135 which is vertically positionable with respect to the first slider by a pin and slot connection. The lower extremity of slider 135 is provided with a notch into which the horizontal arm of a bell crank 137 is fitted. The bell crank is pivoted at 138 and its depending arm lies adjacent to an edge of the clutch arm 73 so that the downward movement of slider 135 will cause the bell crank 137 to engage and move arm 73 in a de-clutching direction at a time determined by the time of energization of magnet 130 which is in turn controlled by a circuit extending through a lower brush to the perforation in the card. Thus the adding wheel is de-clutched from the drive connections after the complement value has been entered therein.

Elusive one entry devices

The mechanism by means of which the elusive one is entered into an accumulator is illustrated in Fig. 7. The units order of each subtracting accumulator has associated therewith a magnet 148 whose armature 149 is secured to the carry lever latch 104 of the units order so that energization of the magnet will trip the units pawl carrying arm 102, whereby, during the carrying portion of the machine cycle, the pawl 100 associated with the units order will advance the units wheel one step.

Balance read-out devices

After various item amounts have been added and subtracted in the accumulator, it is desirable to bring into control between the accumulator and the printing devices some reading devices which make it possible to print a record of the positive or negative balance registered in the accumulator. These reading devices are in the form of electrical brush and commutator structures, one of which is shown associated with the accumulator order in Fig. 6. Each reading device is driven by a gear 109 meshing with accumulator gear 80. Since the ratio of gears 109 and 82 is 2:1, the former will turn through a half revolution for each revolution of the latter.

Each gear 109 carries two pairs of electrically connected brushes 110 and 111 insulated therefrom. For purposes of illustration these two brush sets are shown in Fig. 6 as fastened to one side of gear 109, but actually they appear as in U. S. Patent 2,007,375, where a detailed showing is presented. The secondary pair of mounted brushes 111 are set back 18 degrees or a twentieth of a revolution with respect to brushes 110.

The angular displacement of gear 80 and wheel 83 upon entry of a number, is accompanied by a corresponding angular displacement of gear 109 and brushes 110 and 111. Thus if a "6" is entered into an order, the brushes 110 and 111 will be rotated six steps or six twentieths of a revolution in a counterclockwise direction as viewed in Fig. 6.

Cooperating with brushes 110 is a commutator device comprising contact segments 112 and a common arcuate conductor 113 between which brushes 110 form an electrical connection There are ten segments 112 numbered, "0, 1, 2, 3 . . . 9" and one of the brushes 110 will contact with the segment 112 represented the setting of the accumulator wheel while the other brush contacts with conductor 113. Thus in Fig. 6, brushes 110 are positioned in accordance with the positioning of the accumulator wheel at zero.

The brushes 111 cooperate in a similar way with the segments 112 and form electrical connection between the segments and another common conductor 114. It will be noted in iFg. 6 that this connection is made only between segments "0-8" and conductor 114. A special segment 115 is provided with which one of the brushes 111 contacts when the other brush contacts the special "9" segment 115a. The reason for this arranement will be made apparent hereinafter in the description of the circuit diagram. It was stated hereinbefore that brushes 111 are angularly displaced one step behind brushes 110 so that with brushes 110 set at "0" as in Fig. 6, brushes 111 will take a position bridging "9" segment 115a and the special segment 115. The usual connecting bars or strips are provided to connect electrically all the like numbered segments 112 and 112a together (see wiring diagram). The highest order position of the device is provided with a single segment 115b in the "9" position which is connected by brushes 111 in this order to a common conductor 114b whose configuration is the same as that of conductors 114.

Accumulator resetting mechanism

The shaft 150 (Fig. 7) upon which the index wheels 83 of an accumulator are loosely mounted, is notched for cooperation with spring-pressed pawls pivoted upon and carried by the individual index wheels in such manner that counterclockwise rotation of shaft 150 will engage and drive the index wheels 83 forwardly to zero position during a single revolution of the shaft.

Figure 2:
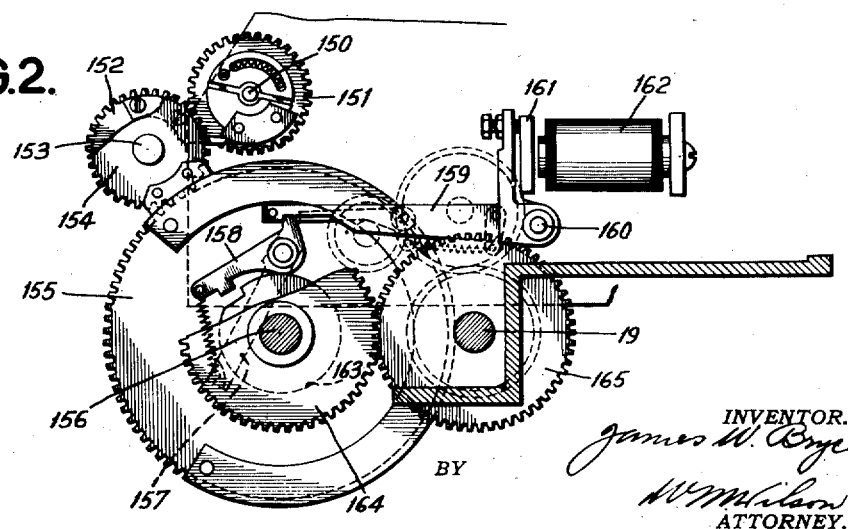
Fig. 2 is a detailed view of the controlling devices of the accumulator resetting mechanism.

Referring to Fig. 2, shaft 150 carries a gear 151 at its extremity which is in engagement with gear 152 mounted upon reset shaft 153. Gear 152, of which there is one for each accumulator, may be selectively coupled to the resetting shaft 153 in the well known manner. At the extremity of shaft 153 is a gear 154 which is adapted to be driven by an intermittent gear 155 which is secured to shaft 156. Also fixed to shaft 156 is an arm 157 which carries a spring-pressed clutch dog 158 normally held in the position shown in Fig. 2 by a latching arm 159 supported by armature shaft 160 of magnet armature 161. Energization of magnet 162 will release dog 158 for engagement with a clutch driving element 163. Element 163 is integral with a gear 164 which meshes with a gear 165 secured upon constantly running shaft 19. With this arrangement, drive element 163 is in constant rotation and whenever it is desired to effect resetting of the accumulator, magnet 162 is energized to establish a connection between the element 163 and the resetting shaft 153. Resetting is usually an accompaniment of total taking and, by virtue of the intermittent gear connection, occurs during the latter part of the total taking cycle. With the present arrangement, total taking is brought about simply by energizing the magnet 24, Fig. 5, to cause operation of the printing devices, and by energizing the reset clutch magnet 162 so that resetting may follow the printing of the totals from the accumulators.

Ledger sheet

Referring now to Figs. 11 and 12 a suitable ledger sheet 166 is shown to comprise a paper carrier or base 167 which is coated with magnetizable granular material 168. To this end, suitable metal powder or filings may be suspended in any suitable binder and sprayed or coated on one of the plies or layers of paper. Suitable record sheets of this type and analyzing means therefor are shown and described in United States Patent No. 2,254,931. A layer of paper 169 suitable for receiving printed impressions is provided to cover the magnetizable material, and is bonded by suitable adhesive material 169a to the said paper base. In addition to the normall ines of printed or posted data indicated by the reference character 170, a plurality of magnetized areas or index points are recorded thereon. For example, the magnetic code mark 171, positioned in the left margin of the sheet and formed on the last printed line of data, is the ledger positioning or line finding code mark, and the differentially positioned magnetized index points 172 are the magnetic code marks representing the new balance which is printed in the last line on the sheet. These magnetic code marks constitute a sensible effaceable record of the balance. The code arrangement of the magnetized index points is precisely the same as the arrangement of the perforations on the record cards C in Fig. 5. It should be mentioned that provision is made whereby the new balance index points 172 are always recorded or formed in the same predetermined area on the ledger sheet, which area is indicated by the reference character AS.

The ledger sheet is also provided with a magnetized entry control index point indicated by the reference character 172a, which is recorded thereon whenever the recorded balance is a negative one. This index point is effective to control certain circuits to be described later for controlling the type of entry operations in the balance accumulator. The said index point is always formed in the same column and in an index point position which is one and a half index points from the "9" index point position, the purpose of which will be understood as the description progresses.

It should be mentioned at this time that the length of the ledger sheet is assumed to be such that when its leading edge is positioned up to, but not under, the recording magnets 179 (Fig. 3), the first line space for receiving the printed data is presented to the printing line position or station. The purpose of this arrangement will be understood as the description progresses.

*Ledger sheet feeding mechanism*

Figures 4A, 9:
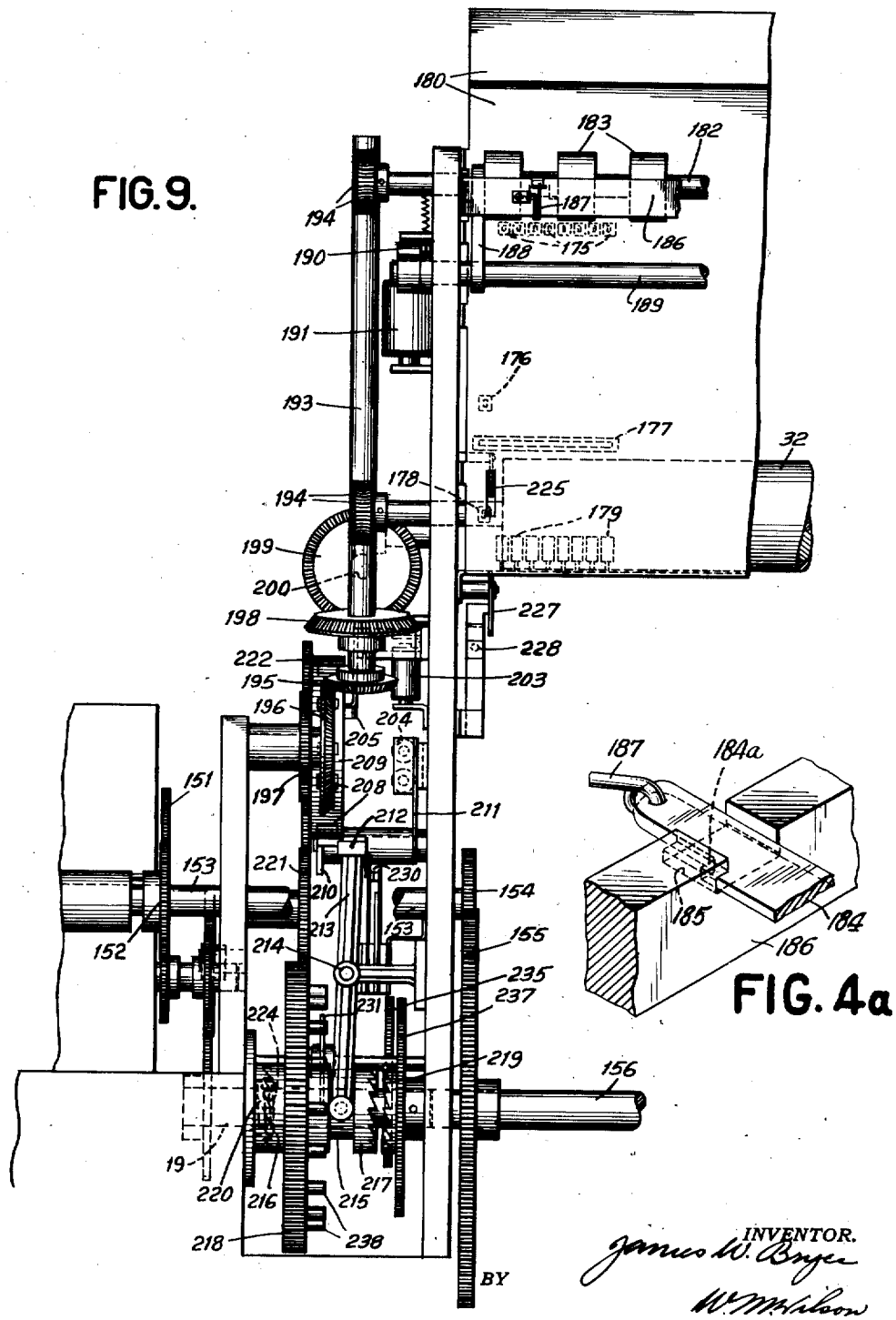
Fig. 4a is a view showing in detail the construction of the extension finger 184 positioned in locking slat 185.
Fig. 9 is an end view of the mechanism shown in Fig. 8.

The main purpose of the ledger sheet feeding mechanism shown in Figs. 8 and 9 is to feed continuously the ledger sheet 166 past the balance code reading magnets 175, the line finding code reading magnet 176, the obliterating magnet 177, and then to the correct printing or posting position, where the sheet is halted momentarily. If the ledger sheet already contains, for example, three lines of printed data, when it is reinserted, it is to be fed to the fourth line to receive the new balance. The magnetized mark 171 is effective to exercise control over the mechanism to be described so that the sheet is positioned to receive the printed data in the fourth line. Incidentally, before the printing of each new line the last line finding mark is obliterated and a new mark is recorded on the new printed line during printing operations. The line finding mark is recorded by the recording magnet 178 which is energized momentarily during the printing operations. After the balance printing operation, the ledger sheet is then fed past the balance recording magnets 179 so that the index points 172 can be recorded magnetically in the predetermined area AS on the ledger sheet to represent the new balance posted in the last line thereon.

Figure 4:
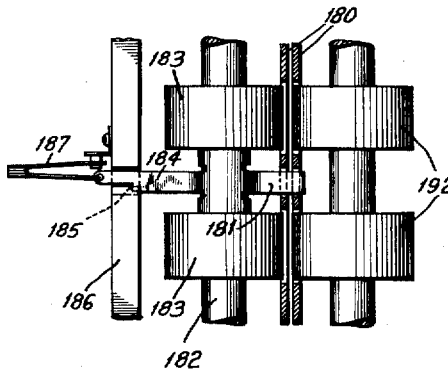
Fig. 4 is a detail view of the ledger sheet stop member device.

The ledger sheet is inserted between suitable guides 180, with the surface of the sheet receiving the printed data facing the operator, and with the lower section of the sheet containing the said predetermined area AS inserted first so that the bottom edge of the sheet strikes the stop member 181. The said stop member is rotatably mounted on shaft 182 upon which feed rollers 183 are fixed. (Also see Figs. 3 and 4.) An extension finger 184 of the stop member having a shoulder portion 184a is arranged to engage a locking slot 185 (see also Fig. 4a) formed in the bar 186 under the influence of toggle spring 187 which is attached to the said extension finger and bar. The shoulder portion 184a cooperates with the slot 185, whenever the extension finger 184 is urged in a direction to the left, as viewed in Fig. 4, by means of the said toggle spring 187. The shaft 182 is rotatably supported by arms 188 (only one of which is shown) which are fastened to shaft 189. Also secured to shaft 189 is the armature 190 of the magnet 191, so that upon energization of the latter, the said armature is attracted thereto causing shaft 189 to be partially rotated in a clockwise direction, thereby positioning the arms 188 and feed rollers 183 to the right, permitting the latter to engage the inserted ledger sheet and cooperate with the feed rollers 192. Positioning of the said arms to the right as viewed in Fig. 8 causes the extension finger 184 to be withdrawn from the locking slot so that the shoulder 184a clears the slot 185, thereby permitting the stop member 181 to be rotated about the shaft 182 by the ledger sheet as it is fed through the guide members. The magnet 191, as will be explained later, remains energized until after the trailing edge of the ledger sheet has passed the stop member 181, permitting the latter to be returned by the spring 187 to the position shown in Fig. 3. Thereafter, when the magnet 191 is deenergized, stop member 181 is shifted to the left by shaft 182 and locked by the ledge above the slot 185 of bar 186. Feed rollers 192 and platen 32 are driven by shaft 193 through the suitable gearing connections indicated by the reference character 194. At one end of the shaft 193 a bevel gear 195 is affixed thereto, which gear engages bevel gear 196, the latter being secured to gear 197. Also fastened to shaft 193 is the bevel gear 198 which meshes with the bevel gear 199 fixed to shaft 200, the latter being arranged to drive the feed rollers 201 through the gearing connections 202.

Magnets 203 and 204 are the main control elements for effecting selective rotation of the said shafts 193 and 200, and thereby in turn controlling the feeding and positioning of the ledger sheet.

An operating lever 205 is rigidly secured to the armature 206, associated with magnet 203, and rotatably mounted on stud 207, so that, upon energization of the said magnet, the lever 205 is rotated in a clockwise direction to engage one of the slidably arranged pins 208 of the pin drum 209 and displace the engaged pin so that its free end extends beyond the periphery of the said drum. The said drum is provided with twelve positionable pins 208, one being shown in its displaced position, while the remaining ones are shown in the normal retracted positions. Each displaced pin remains in its extended position until restored to the normal position by an arm 210 which is secured to armature 211 of magnet 204, and arranged to engage any displaced pins, upon energization of the said magnet to rotate its armature and the said arm when any one pin is positioned opposite arm 210.

Upon rotation of the pin drum 209, the displaced pin 208 is rotated so as to engage the camming surface 212 secured to lever 213 which is pivoted at 214. The lower portion of lever 213 is bifurcated and arranged to cooperate with a clutch member 215 slidably mounted on shaft 19. The said clutch member comprises the clutching elements 216, 217 and gear 218. Thus, whenever a displaced pin 208 engages the camming surface of lever 213, the latter is positioned so that the clutch element 217 is disengaged from a clutch tooth driving element 219 which is pinned to shaft 19, and the clutch element 216 is engaged with the fixed ratchet tooth member 220 which is secured to the machine frame, thereby holding the clutch member 215 in a locked position. Gear 218 meshes with an idler gear 221 which in turn meshes with gear 222, the latter being secured to the pin drum 209. Also meshing with gear 222 is an idler gear 223 which engages the gear 197. It is seen now that the traced gearing connections remain locked as long as a displaced pin 208 causes the clutch member 215 to remain in a locked position, due to the engagement of the clutch elements 216 and 220.

Now, assume that the ledger sheet is inserted as described hereinabove, and that the magnet 191 is energized and maintained in this condition so that the stop member 181 is released and feed rollers 183 engage the ledger sheet, and that magnet 204 is energized to rotate partially the armature 211 and arm 210 to restore the displaced pin 208 to its normal retracted position, thereby releasing the lever 213. Upon release of the said lever, the clutch member 215 is forced to the right as viewed in Fig. 9 by means of the compressed spring 224, so that the clutch elements 217 and 219 are engaged causing gear 218 to be rotated by shaft 19, and in turn causing the described gearing and pin drum to be rotated. Due to the described operation, the ledger sheet is now fed so that the balance code marks 172 pass by the reading magnets 175 and are sensed or read thereby for control purposes to be described later. Now, as the feeding of the ledger sheet continues, the line finding mark 171 is sensed by the magnet 176 to control the positioning of the ledger sheet, and then followed by an obliterating operation, whereby the sensed balance code marks and line finding mark are obliterated by the action of magnet 177. The said manget 176 is positioned so that the line finding mark is sensed eight printing line spaces ahead of the printing position. The sensing of the mark 171 by the magnet 176 causes the magnet 203 to be energized, and in turn causes one of the pins 208 to be displaced by means of the partially rotated armature 206 and lever 205. The said pin 208 when displaced as described is seven spaces or steps distant from the camming surface 212 of the clutch operating lever 213.

The ratios of the various gears of the train rotated by gear 218 and shaft 19 are such that the pin drum 209 is rotated so that one of the pins 208 will pass the operating lever 205 while the ledger sheet is fed one line space. Thus, it is understood that the last printed line position on the sheet is sensed eight line spaces ahead of the printing position, and the ledger sheet is fed seven line space positions before the actuating gearing is locked, due to the engagement of said displaced pin with the camming surface on lever 213, and the shifting of the clutch member 215, so that elements 216 and 220 remain engaged to maintain the gearing locked until magnet 204 is energized again. In this manner, the ledger sheet is halted at the printing position, and the sheet is positioned so that the line space below the previously printed line is located at the printing position. It should also be mentioned that the clutch teeth on elements 216, 217 and 219 are arranged so as to operate in a timed relationship with the movement of the ledger sheet, that is, one tooth, for example of the driving element 219 will pass a fixed position or traverse a fixed distance for each line space movement of the ledger sheet, and furthermore, the arrangement is such that the ledger sheet is fed at a rate so that one line space is fed for each point of the machine cycle.

As the leading edge of the ledger sheet approaches the printing position it actuates the pivoted control lever 225 (which is similar to the usual card lever) causing the associated contacts 226 to be closed, which condition is maintained as long as the ledger sheet is fed past this point. The control exercised by these contacts will be described later in connection with the description of the circuit diagram.

After the new balance has been derived, a printed record thereof is made on the ledger sheet, also at this time, the recording magnet 178 is energized to record a magnetized mark on the printed line in the left-hand margin of the sheet when viewed as in Fig. 11. After the said printing and line finding mark recording operations are completed, the magnet 204 is energized at the proper time, causing the displaced pin 208 to be restored to its normal position as described hereinabove, thereby permitting ledger sheet feeding operations to be resumed. As the leading edge of the ledger sheet travels towards the code recording magnets 179, the pivoted control lever 227 is engaged to cause contacts 228 to be closed for control purposes to be described later. It is to be noted that the free end of lever 227 is arranged when rotated partially by the ledger sheet, to engage only momentarily the extension 229 of contacts 228, so that the contacts are closed momentarily and then permitted to reopen. The said lever and contacts are positioned so that closure will be effected when the leading edge of the ledger sheet is seven line spaces distant from the code recording magnets 179. It will be seen that closure of these contacts causes the magnet 203 to be energized, and thus cause the feeding of the ledger sheet to be interrupted after the additional movement of seven line spaces. The leading edge of the ledger sheet is now adjacent to the code mark recording position, and properly positioned with respect thereto so that upon a subsequent ledger sheet feeding operation, the predetermined area of the sheet indicated by the reference character AS is moved past the recording magnets 179 in proper timed relationship with the operation of the balance read-out mechanism.

With this provision of halting momentarily the ledger sheet before the code marking operations are initiated so that the leading edge of the sheet is always brought to rest at the same reference position, it will be evident that recording of the code marks will always occur in the said predetermined area irrespective of the location of the line of the new printed balance.

After the ledger sheet is properly positioned with respect to the recording magnets 179, the magnet 204 is energized again, at the proper time, to permit the ledger sheet to be fed past the said recording magnets, whereupon the recording magnets are energized in accordance with the new derived balance to record the new balance data on the sheet by magnetizing discrete areas of the sheet at different index point positions. The ledger sheet is now fed continuously past the said recording magnets and when the trailing edge thereof passes the lever 227, the latter resumes the normal position indicated in Fig. 8. Due to the partial counterclockwise rotation of lever 227 the associated contacts 228 again are closed momentarily to effect energization of magnet 203, and thereby cause the ledger sheet feeding mechanism to be declutched and locked, as described hereinabove, when seven line spaces have been traversed by the sheet after the said energization of magnet 203. The ledger sheet is now positioned so that it can be ejected manually, or ejected by the second set of feed rollers 201 during the next cycle of operation of the described mechanism.

The magnet 191 is deenergized to permit the feed rollers 183 to be restored to the normal position described above, at a time in the machine cycle, when the trailing edge of the ledger sheet is fed beyond the stop member 181. At this time, the said stop member is partially rotated in a counterclockwise direction and restored to the normal position, shown in Fig. 8, by means of the spring 187. Now, upon deenergization of magnet 191, the associated armature 199 and arm 188 are rotated in a counterclockwise direction, thereby urging or sliding the extension finger 184 into the locking slot 185 formed in bar 186. As mentioned before, by rigidly fixing the stop member 181 in this manner a definite positioning device is provided for the operator whereby the ledger sheet initially is always inserted the same distance in the guides 180.

It should be mentioned that contacts 230 are provided, and are suitably disposed with respect to the lever 213 so that they are closed when the said lever is positioned by a displaced pin 208 as shown in Fig. 9, and opened when the lever is not engaged by any one of the pins 208.

Additional mechanism is provided to insure positive positioning of the ledger sheet with respect to the several reference points referred to, whenever the ledger sheet is halted at these points. Referring to Figs. 8, 9, 10 and 10a, this mechanism is shown to comprise a camming member 231 which is reciprocated by means of a crank pin 232 formed on shaft 233. A driving gear 234 is secured to shaft 233, and said gear is driven by gears 235, 236, and 237, the latter gear being secured to clutch element 219 which in turn is secured to shaft 19. The ratio of the gearing is such that the camming member 231 is reciprocated by the crank pin 232 once for each index point of the machine cycle. The gear 218 is provided with a plurality of equally spaced studs or pins 238, which under certain conditions are acted upon by the said reciprocated camming member. The arrangement of the described elements is such that, at the times the gear 218 is continuously rotated, the camming surface 231a is not effective to engage any of the pins 238; however, whenever the lever 213 is positioned by one of the displaced pins 208 so that the clutch elements 217 and 219 are disengaged, and in the event the driven gear 218 is not positioned properly to its home position, by virtue of the engaged clutch elements 220 and 224, the camming surface 231a of the reciprocated member 231 is now effective to engage one of the pins 238 to provide the additional rotation necessary to position the gear 218 to its proper home position, thus assuring at all times, that the ledger sheet is properly positioned at the various reference points.

Ledger sheet reading and recording devices

Referring to Figs. 3, 8, and 9, a plurality of reading magnets 175 are shown to be situated between the feed rollers 192 and printing platen 32, and suitably disposed with respect to the ledger sheet guides 180 so that the pole pieces thereof are in close proximity to the ledger sheet inserted in the guides. A reading magnet is provided for each column of data to be sensed on the ledger sheet. This data is represented by the columns of discretely magnetized index points indicated by the reference character 172 in Fig. 11.

The principle of reading magnetized recordings is well known, therefore the brief description is deemed sufficient. Upon feeding the columns of discrete magnetized index points 172, past the reading magnets, the remanent magnetic fields thereof are effective to induce controlling potentials in the coils of the related magnets 175. The said magnets are connected to the usual well known type of electronic amplifiers indicated generally by the reference character 175a (Fig. 14b) which amplifiers are arranged normally to be non-conductive so that the associated relays 500 remain deenergized, but are rendered conductive at such times when the induced potentials of magnets 175 are impressed thereupon, thereby causing the said associated relays 500 to be energized.

In this manner, when the differentially positioned magnetized index points are fed past the reading magnets 175, the index points induce controlling potentials in the associated magnets at differential times to cause the related relays 500 to be energized at such differential times.

One of the reading magnets 175 is positioned opposite the column of the ledger sheet wherein a data entry control index point 172a is formed whenever the balance recorded on the ledger sheet is a negative balance. As mentioned hereinbefore, the index point 172a is positioned one and a half index points below the "9" index point position. An entry control relay designated ECR is shown connected to the amplifier coupled with the last mentioned reading magnet, which relay is energized whenever the special entry control index point is sensed for data entry control purposes, which will be described in detail later, so that the sensed negative balance amount is entered subtractively in the balance accumulator.

A single reading magnet 176, similar to the reading magnets 175, is positioned below the set of reading magnets 175, so that the magnetized line finding mark or index point 171, which is located in the left margin of the sheet as viewed in Fig. 11, can be sensed whenever moved past the said magnet 176. The usual amplifier 176a is shown connected to the reading magnet 176, which in turn is connected to the line finding control relay LFR, said amplifier being conditioned so that normally the relay LFR is deenergized when no index points are sensed, but arranged to be conductive, upon sensing the line finding marks, to energize, at such times, the said line finding control relay.

Due to the location of the mentioned reading magnets, the balance reading magnets 175 are influenced first by the balance index points 172 to effect entry of the recorded balance into the balance accumulator; and thereafter the line finding index point 171 is sensed by the reading magnet 176 to effect automatic positioning of the ledger sheet so as to be in proper posting position.

An obliterating magnet 177 is provided and disposed between the line finding sensing station and the balance printing station. The obliterating magnet is arranged to be elongated so as to extend across all the columnar positions in which magnetized index points may appear on the ledger sheets. During the various machine operations to be set forth hereinbelow, the obliterating magnet is connected at all times to an alternating potential source 177a (Fig. 14c). The effect of this alternating potential, which is impressed continuously upon the obliterating magnet is known to create alternating magnetic fields, the influence of which, when the ledger sheet is moved therepast, is known to effect neutralization or obliteration of the magnetized index points recorded thereon. Therefore, it is seen that during the initial ledger sheet feeding operations, the magnetized index points, namely, the balance index points, the data entry control index point, the line finding control index point, are obliterated from the ledger sheet before posting operations are initiated.

At the posting or printing station, a recording magnet 178 is provided, which is suitably disposed to effect recording of a line finding index point in the marginal column reserved for this code designation. Upon momentary energization of the said recording magnet, by impressing a unidirectional impulse thereupon, a magnetic field is set up which is effective to magnetize the ledger sheet at an index point position opposite the pole piece of the said magnet, thereby causing a discrete magnetized index point to be formed on the sheet, which index point, upon reinsertion of the sheet in the machine, is effective to influence the line finding reading magnet 176 as just set forth. The position of this magnet at the printing station is such, that the magnetized index point, indicated by the reference character 171 in Fig. 11, is formed in the line space receiving the printed data during the printing operations. It will be described in detail how this magnet is energized during the printing operations to effect recording of the magnetized line finding designation at the time the new balance is recorded.

The balance recording magnets 179 are shown situated between the feed rollers 201. An individual recording magnet is provided for each column in which it is desired to effect recording of the magnetized index points to represent the new balance, which recording is under control of the accumulator and the associated balance read-out mechanism. The controlling elements for rendering these recording magnets effective to form the discrete magnetized index points, in the manner just described, representing the new balance, and indicated on the ledger sheet by the reference character 172, will be described later.

Circuit controlling devices

A plurality of timed circuit controlling devices are provided for exercising control over the various control circuits of the machine and comprise the emitter device 650 (Fig. 14b), circuit breaker contacts CBC (Fig. 14a), and the F, L, P and R cam contacts (Figs. 14a–14c). The timing of the operations of these devices in the machine cycle is shown in Fig. 13. The emitter device 650 is well known in this art and comprises a plurality of individual conducting segments 650c, which are engaged successively by one of the brushes 650a and connected to the common conducting strip or member 650b by the other brush. The brushes are rotated by a shaft (not shown), which in turn is rotated by shaft 19 and suitable reduction gears so that the brushes are rotated at half the speed of shaft 19. This mechanism is shown in detail in Figs. 4 and 5 of Patent 2,126,621. This device controls the balance recording and total printing circuits in a manner to be fully explained hereinafter.

In Fig. 1 is shown a shaft 81 which is driven from the gears of the card feeding mechanism and rotates only when cards are advanced. Controlled by suitable cams on shaft 81 are contact devices, each of which is designated by the letter "F" indicating that they are associated with the feeding mechanism and operative only when the feeding mechanism functions. In Fig. 3 is shown a shaft 241 which is driven by gears 242 and 243, the latter being fixed to the print cam 21, and rotates only during the total print operations, that is, at the times when magnet 24 is energized. Secured to the said shaft 241 are suitable cams for controlling the contact devices, each of which is indicated by the letter "P," indicating that they are associated with the printing mechanism, and operative only when this mechanism functions. Similarly, suitable cams are secured to the shaft 156 (Fig. 2) for controlling the contact devices, each of which is indicated by the letter "R," indicating that they are associated with the resetting mechanism, and operative only when this mechanism functions. Similar cam controlled contact devices prefixed with the letter "L" are provided, the control cams for which are carried by or may be driven from the shaft 19, and these devices are in constant operation as long as the driving motor functions. The cams for operating the circuit breaker contacts CBC are likewise secured to shaft 19.

Operation of the machine

Referring now to Figs. 14a, 14b, and 14c, arranged in the order named, the operation of the machine will be described in connection with the circuit diagram.

*Initial reset cycle.*—To condition the machine for normal operation, it is first necessary to initiate a total and reset operation. This is accomplished by depressing the reset key to close the reset contacts R and complete a circuit through relays 40 and 41 as follows: from one side of the line 464, through relay coil 40, relay coil 41, reset contacts R to line 465, thus energizing the two relays mentioned. Energization of relay 41 causes the relay contacts 41a to open and thus prevent a card feeding cycle during ensuing resetting operations and upon conditioning of the group control devices. The energization of relay 40 causes its associated contacts 40a to 40d to close. Closure of contacts 40a completes a circuit through the drive clutch magnet 37 as follows: from line 464, through the drive clutch magnet coils 37, the contacts 37a, relay coil 39, the now closed contacts 40a, the stop key contacts SP1 to line 465. Energization of the drive clutch magnet 37 causes the coupling of the driving motor TM to the pulley shaft 6 mentioned hereinabove. Energization of relay 39 causes contacts 39a to close and complete a holding circuit for itself and the drive clutch magnet through the cam contacts L1. The operation of the drive clutch magnet armature upon being attracted, causes the contacts 37a to open, thus opening the shunt circuit around the relay coil 38 and permitting said relay to operate and close its associated contacts 38a. The closure of contacts 38a completes a circuit through the main drive motor TM.

Closure of contacts 40b completes a circuit through the list clutch magnet 24 as follows: from line 464 through magnet coils 24, contacts 40b, contacts 61a, which are closed as long as the ledger feeding mechanism remains inoperative, due to closed contacts 230 which connect the relay coil 61 to the lines 464 and 465, and cam contacts L2 to line 465, energizing the said list magnet. At the same time a circuit through the reset magnet 162 is completed as follows: line 464 to reset magnet coils 162, contacts 40c, contacts 61a and cam contacts L2 to line 465, energizing the said reset magnet. Thus, upon depressing the reset key, a total print and reset cycle is initiated.

Closure of contacts 40d completes a circuit through the relay coil 63 (Fig. 14c) as follows: from line 464, through the relay coil 63, contacts 40d now closed, and cam contacts L3 to line 465. Energization of the relay 63 causes its associated contacts 63a and 63b to be closed. The closure of contacts 63a completes a holding circuit for the relay 63 back through the cam contacts P8 and R2 to line 465.

Closure of contacts 63b completes a circuit through relay coil 48 (Fig. 14a) as follows: from line 464, through the normally closed MCRc contacts, relay coil 48, the closed contacts 63b to line 465. Energization of the relay coil 48 closes its associated contacts 48a and 48b, and through contacts 48b and 63b establishes a holding circuit therefor. With the total control switch TCS set at its closed position, and upon closure of cam contacts R1 and P2, a circuit is completed through a balance print control magnet 49 as follows: from line 464, through cam contacts R1 or P2, contacts 48a now closed, switch TCS, through magnet coil 49 and lines 679 and 465. Energization of magnet 49 closes contacts 49a, and completes balance print control circuits from the accumulator readout units to the total print magnets 36 as described in greater detail hereinafter.

During the total print and reset cycle, the cam contacts P3 are closed. Closure of contacts P3 completes a circuit through the control relay coil MCR as follows: from line 464, through cam contacts P3, relay coil MCR and cam contacts F2 to lines 679 and 465. The energization of relay MCR causes its associated contacts MCRc to shift and establish a holding circuit for itself as follows: from line 464, through the new transferred contacts MCRc, relay MCR, the F2 cam contacts to lines 679 and 465. The energization of relay coil MCR also causes the associated contacts MCRa to open and contacts MCRb to close. It should be stated that the L cam contacts function whenever the drive motor is operating, the F cam contacts only function during card feeding operations, and the R and P cam contacts function only during reset and total printing operations, respectively.

Near the end of the first cycle, cam contacts L1 open, thus breaking the holding circuit through the relay coil 39 and the drive clutch magnet 37. The machine is now conditioned ready to start feeding cards and controlling item entry in the normal manner.

*Starting circuits.*—Assuming that cards have been properly placed in the card feeding hopper, the operator now depresses the start key, thus closing the start key contacts ST1 and completes a circuit through relay coil 42 as follows: from line 464, through relay coil 42, the normally closed contacts 44a, normally closed contacts LCLb and start key contacts ST1 to line 465. Upon depression of the start key contacts ST2 (Fig. 14c) are also closed but are ineffective to complete a circuit owing to the fact that the lower card lever contacts are open at this time. Energization of relay coil 42 causes associated contacts 42a and 42b to close. Closure of contacts 42a completes a circuit through the drive clutch magnet as follows: from line 464, through the drive clutch magnet 37, the contacts 37a, relay coil 39, contacts 42a now closed, and through the stop key contacts SP1 to line 465. As previously described, upon energization of the drive clutch magnet 37 the contacts 37a open, thus causing the relay 38 to operate and again start the drive motor TM, likewise, a holding circuit is established through contact points 39a as previously explained.

Closure of contacts 42b completes a circuit through the relay 43 as follows: from line 464, through relay coil 43, contacts 42b now closed, the stop key contacts SP2, contacts 41a, contacts MCRb now closed, to line 465.

Energization of relay 43 causes its associated contacts 43a and 43b to close. Closure of contacts 43a establishes a holding circuit for the relay 43 as follows: from line 464, through relay coil 43, contacts 43a now closed, to the stop key contacts SP2, contacts 41a, the shifted contacts MCRb, to line 465. Closure of contacts 43b completes a circuit through the card feed clutch magnet 18 as follows: from line 464 through the card feed clutch magnet 18, contacts 43b now closed, through cam contacts L2 to line 465. With the circuits conditioned as described, the card feeding operations can be started.

*Card lever circuits.*—As the first card is fed from the hopper through the card feeding mechanism, the upper card lever contacts UCLC are closed just before the leading edge of the card enters under the sensing brushes UB at the upper station. Upon closure of the upper card lever contacts UCLC, a circuit is completed through the upper card lever relay UCL and the relays 46 as follows: from line 464, through relay coil UCL, relay coil 46, and the closed contacts UCLC to line 465. The energization of relay 46 sets up a holding circuit for itself, and the relay UCL through the associated contacts 46a and cam contacts L5 to line 465. Thus, as long as cards are feeding through the feed unit, relay UCL and relay 46 will be maintained energized by the overlapping condition between cam contacts L5 and the UCLC contacts. The energization of the relay UCL causes its associated contacts to be operated for well known controlling purposes. As a card passes the upper brushes UB, information recorded therein is sensed by the upper brushes and certain functions are performed which will be described hereinafter.

Near the end of the second card feed cycle, the lower card lever contacts LCLC are closed and complete a circuit through the relay LCL and relay 47 as follows: from line 464, through relay coil LCL, relay coil 47, through the now closed contacts LCLC to line 465. Energization of the relay 47 completes a holding circuit for itself and the lower card lever relay through contacts 47a and cam contacts L6 to line 465. The lower card lever relay LCL and relay 47 will be maintained energized as long as cards are being fed, in a manner similar to that for the upper card lever relay.

The energization of the upper card lever relay causes the closure of contacts UCLa which complete a holding circuit for the drive clutch magnet 37 as follows: from line 464, through the drive clutch magnet 37, the relay 38, the relay coil 39, contacts 39a, the contacts UCLa now closed and through the stop key contacts SP1 to line 465. Thus, the drive clutch magnet 37 will be maintained energized as long as cards are in the card feeding mechanism. A parallel holding circuit is set up through contacts LCLa which are closed upon energization of the lower card lever relay LCL. This circuit maintains the drive clutch magnet energized until the last card has passed the lower sensing brush station. Just prior to the closure of the lower card lever contacts, cam contacts F2 open and relay MCR is deenergized. The deenergization of relay MCR allows the associated contacts to restore to normal. Thus, the contacts MCRb are opened and contacts MCRa are closed. Opening of contacts MCRb opens the circuit through the relay 43, thus causing the associated 43a points to restore to normal. The opening of contacts 43b opens the circuit through the card feed clutch magnet 18, thus causing the card feeding mechanism to stop at the completion of the second card feed cycle. The closing of contact MCRa completes a circuit through the relay coil 44 and the relay coil 45 as follows: from line 464, through relay coil 44, relay coil 45, cam contacts L8 now closed, contacts MCRa to line 465. Energization of the relay 44 causes contacts 44a to open and thus prevent operation of relay 42 and the card feed unit by depression of the start key while a total and reset cycle is functioning. The energization of relay 45 causes closure of contacts 45a and completion of a circuit through the list clutch magnet 24 as follows: from line 464, through the magnet 24, contacts 45a, contacts 61a, and cam contacts L2 to line 465. Closure of contacts 45b completes a circuit through the relay 63 as follows: from line 464, through the relay coil 63, contacts 45b and cam contacts L3 to line 465. Energization of relay coil 63 sets up a holding circuit for itself back through contacts 63a, cam contacts P8 and R2 to line 465. The energization of relay 63 also closes contacts 63b and sets up the circuit for total printing in the manner previously described. With the starting cycles completed and the cards in position, the machine is ready for ledger sheet feeding operations.

*Initial ledger sheet feeding operations.*—Assume that the ledger sheets are arranged in order or preselected to correspond to the order and arrangement of the grouped record cards, and that the card now presented to the lower brush station is the first card of the group corresponding to the ledger sheet to be inserted in the ledger feeding mechanism. It is also assumed for the present description that the inserted ledger sheets are provided with lines of printed balances, and that the last balance is recorded magnetically in section AS of the ledger sheet. The ledger sheet is inserted in the guides 180 until the leading edge engages the locked stop member 181, thereby insuring that the sheet is properly prepositioned so that during the ensuing sheet feeding operations the sheet will be fed in proper timed relationship with the various control elements of the machine. The start key is then depressed to close the associated contacts ST1 and ST2. Closure of the ST1 contacts are not effective at this time to exercise any control over the machine, since contacts LCLb are open. Closure of contacts ST2 completes a circuit from line 464 to relay coil 52, contacts LCLc, contacts 58b, contacts 61b, said start contacts ST2, cam contacts L19, and normally closed contacts 59a to line 465, energizing said relay. A holding circuit is established for this relay as follows: from line 464 to relay coil 52, contacts 52a, and contacts 60c to line 465. Due to closure of contacts 52b, a circuit is completed from line 464 and 465 to magnet coils 191, energizing said magnet. Upon energization thereof the feed rollers 183 are rotated to grip the inserted ledger sheet, and the stop member 181 is released so that the sheet is now free to be fed through the machine. Closure of contacts 52c permits a circuit to be completed to magnet 204, when the cam contacts L11 are closed, from line 464 to magnet coils 204, contacts 52c, contacts 58c, and said cam contacts L11 to line 465, energizing said magnet. It is remembered that energization of this magnet causes the displaced pin 208 of the pin drum 209 to be restored to its normal retracted position, thereby permitting the lever 213 to be released to effect engagement of clutch elements 217 and 219, thus causing the feeding mechanism for the ledger sheet to be operated.

It should be stated that the cam contacts L11 are arranged to be closed at a time in the machine cycle so that the ledger sheet will be fed past the reading magnets 175 in synchronism with the operation of the control elements of the machine, that is, the "9" index point position indicated in section AS of the sheet, arranged to receive the balance code marks 172, will be fed past the reading magnets 175 at the "9" point in the machine cycle.

Closure of contacts 52d permits a circuit to be completed, when cam contacts L12 are closed, from line 464 to relay coil 57, said contacts 52d, contacts 58d and 61c to the said cam contacts L12 and line 465, energizing said relay to close the associated contacts 57a, 57b, and 57c. Closure of contacts 57a establishes a holding circuit for said relay from line 464 to relay coil 57, said contacts 57a and cam contacts L13 to line 465. The relay 58 is energized upon closure of contacts 57b and the cam contacts L14 by the circuit from line 464 to relay coil 58, said contacts 57b and L14 to line 465, and consequently causing contacts 58a to close and contacts 58b—58d to open. Closure of contacts 58a establishes a holding circuit for relay 58 through the closed contacts 52e. Opening of contacts 58b prevents the closure of a circuit to relay 52 by depression of the start key; opening of contacts 58c prevents subsequent energization of magnet 204 upon closure of cam contacts L11; and opening of contacts 58d prevents a circuit from being established to relay 57 upon subsequent closure of cam contacts L12.

Now, as the ledger sheet is fed past the reading magnets 175, the differentially positioned magnetized index points 172, in the various columns of the section AS representing the last balance, are effective to influence the related reading magnets at the differential times the index points are sensed, thereby causing the associated relays 500 to be energized and effect closure of the related contacts 500a. Closure of the said contacts 500a complete circuits to the add magnets 77 to energize these magnets at differential times in the machine cycle for effecting entries in the balance accumulator of the sensed data represented by the magnetized index points 172, precisely in the same manner as the sensed data on the record cards are entered therein under control of the lower sensing brushes LB. A typical circuit can be traced from line 465, through the circuit breaker contacts CBC, contacts 500a, plug wire to socket 663, contacts 64g, magnet 77 to line 464.

In the event the balance recorded magnetically on the ledger sheet is a negative one, the said sheet is provided with an entry control magnetized index point indicated by the reference character 172a, the purpose of which is similar to that of the well known X perforations in perforated record cards. The entry control index point is recorded at a position so that the said index point is sensed before the data recordings. The purpose of this arrangement is well understood, namely, so that the balance accumulator can be conditioned properly for the entry of the negative balance. For this reason the said index point is formed one and a half index points ahead of the "9" index point positions.

Now, as the ledger sheet is fed past the reading magnets 175, the magnet arranged to sense the entry control index point 172a is influenced thereby to cause the associated relay ECR to be energized. It is understood now, that this control relay is energized one and a half cycle points before the "9" point of the machine cycle. Energization of the said relay causes the associated contacts ECRa to close and complete a circuit to relay 64, which circuit shunts the contacts 62b, 43c and cam contacts L17. A holding circuit is then established for this relay through contacts 64a and cam contacts L18. Upon energization of relay 64 the associated contacts which are connected to the add and subtract control magnets of the accumulator are operated as follows: contacts 64h—64n are closed to connect the add control magnets 77 and the elusive one control magnet 148 to the "9" conducting segment of emitter device 650; the transfer of contacts 64b—64g open the circuits from the plug sockets, one of which is designated 663, to the related add magnets 77, and connect the said sockets to the related subtract magnets 130. In this manner, the said add magnets are energized at the "9" point in the machine cycle as though to add nines in each order of the accumulator. A typical circuit can be traced from conductor 464 to the add magnet connected to contacts 64h, said contacts 64h, "9" conducting segment of emitter device 650, brushes 650a, common conducting member 650b to line 465.

Now, as the magnetized balance code index points 172 are sensed to influence the reading magnets 175 at the differential times the said index points move therepast, the subtract control magnets 130 are energized at the said differential times to cause the adding mechanism to be declutched, as described hereinbefore, thereby entering the nines complement of the sensed data. A typical circuit can be traced from line 465 to circuit breaker contacts CBC, contacts 500a, plug wire to socket 663, transferred contacts 64g, magnet 130 to line 464. The elusive one is added into the units order upon energization of magnet 148 to change the nines complement of the amount of a tens complement.

In this manner the last balance recording on the ledger sheet is sensed to effect entry of the positive or negative amount in the balance accumulator.

Operation of the ledger sheet feeding mechanism is continued until the sheet is fed to present the next clear line space theron to the printing position, whereupon ledger sheet feeding operations are interrupted until the new accumulated balance is readout and printed on the ledger sheet. The detailed description of the automatic ledger sheet line finding operations and obliterating operations will be given presently.

It should be stated at this time, that near the beginning of the balance sensing and entry cycle, cam contacts L4 are closed to complete a circuit from line 464 to magnet coil 42, closed contacts 44a and 57c to the said cam contacts L4 and line 465 energizing said magnet. Upon energization of the said magnet, the magnet 43 and card feed clutch magnet 18 are energized, as described hereinabove, to cause the record cards to be fed through the machine. The clutch mechanism controlled by magnet 18 is of the type well known and constantly used in record controlled machines, and is not rendered operative until the "D" position at the end of the said balance entry cycle.

*Automatic line finding operations.*—It has been stated before that the ledger sheets are provided with a magnetized line finding mark or index point 171 in one margin of the ledger sheet, and that this index point is recorded in the line space where the last balance amount is printed, to enable the control elements of the machine to determine the location of the last printed line on the ledger sheet.

Now, as the ledger sheet is advanced towards the printing station, as described hereinabove, and after the balance code marks are sensed by the reading magnets 175, the line finding index point 171 is moved past the reading magnet 176 to influence this magnet and cause the relay LFR to be energized, thereby effecting closure of the associated contacts LFRa. It might be well to repeat at this time, that the said reading magnet 176 is positioned a distance equivalent to eight ledger sheet line spaces from the printing station.

Closure of contacts LFRa completes a circuit to the magnet 203 to effect energization of this magnet, thereby causing one of the pins 208 of the pin drum 209 to be displaced. It is understood from the description given hereinabove, that upon displacement of one of the said pins 208, the ledger sheet feeding mechanism is rendered inoperative upon the feeding of the sheet an additional distance equivalent to seven line spaces. Thus, the last printed line on the ledger sheet will be positioned one line space above the printing station, upon interruption of the ledger sheet movement. It is seen that in this manner the ledger sheet is positioned to receive the imprint of the new balance amount in the first clear line space on the sheet.

Up to this point, the old balance represented by the index points 172, and the line finding index point 171 have been sensed by the respective reading magnets 175 and 176. It should be mentioned now that as the said magnetized index points 172 and 171 are moved past the obliterating magnet 177, which is disposed between the reading magnet 176 and the printing station, the alternating or changing magnetic fields, which are created by impressing the alternating E. M. F. from the source 177a upon magnet 177, and impressed upon the magnetized index points, are effective to neutralize or obliterate these index points. In this manner the previous balance and line finding code marks are erased from the ledger sheet, and the sheet is conditioned so that a new balance and line finding marks can be recorded magnetically on the ledger sheet for further control purposes, upon reinsertion thereof.

*Item entry operations.*—Record card feeding operations continue as long as contacts 43b remain closed, so that upon closure of the cam contacts L2, each machine cycle, the said clutch magnet 18 can be energized each cycle.

The data or items perforated on the record cards C are accumulated under control of magnets 77 and 130, which are energized differentially by impulses, the initiation of which is controlled by the movement of the cards past the lower brushes LB. A typical adding circuit can be traced from line 465 through circuit breaker contacts CBC, card lever controlled contacts LCLe, contact roll 481, the perforation in the record card, brush LB, plug wire to socket 663, lower contacts 64g, magnet 77 to line 464.

In order to determine the type of entries from the record cards, a column on the record card is punched with an X perforation when the data thereon is to be entered subtractively in the accumulator, and when the data on a record card is to be entered additively there is no X perforation provided in the said column (this provision for controlling entries by the use of X perforation is well known in the art). In addition thereto, a plug connection is provided from the plug socket 400 (Fig. 14c) to the socket of the upper brush arranged to sense the columns wherein the X perforations are to appear; and the cam contacts L16 are timed to close at the "11" point in the machine cycle.

Therefore, when a record card provided with an X perforation is fed past the upper sensing brushes UB, the following circuit is completed, upon sensing the said perforation: line 465, circuit breaker contacts CBC, contacts UCLb, contact roll 474 to sensing brush UB, plug connection to socket 400, cam contacts L16 and relay coil 62 to line 464, energizing said relay. A holding circuit for this relay is established through contacts 62a and cam contacts F4. Closure of contacts 62b permits a circuit to be completed to relay 64, when the cam contacts L17 are closed, as follows: line 464, relay coil 64, contacts 62b, contacts 43c, and cam contacs L17 to line 465, energizing said relay. A holding circuit is then established for this relay through contacts 64a and cam contacts L18. Closure of contacts 64h—64n connects the add control magnets 77 and elusive one control magnet 148, to the "9" conducting segment of emitter device 650. The transfer of contacts 64b—64g opens the circuits from the plug sockets to the related add magnets, and connects the said sockets to the related subtract magnets 130. In this manner the add magnets are energized at the "9" point in the machine cycle as though to add nines in each order of the accumulator, and the sensed perforations are now effective to energize the subtract magnets 130 at the differential times the perforations are sensed by the lower brushes LB, and cause the adding mechanism to be declutched as described hereinabove, thereby entering the nines complement of the sensed data. The elusive one is added into the units order, upon energization of magnet 148 to change the nines complement to a tens complement.

Item entry operations under control of the record cards continue so as to form the new balance in the accumulator, until a group change occurs to initiate a total print and reset cycles.

*Group control operations.*—The automatic group control devices are of the form disclosed in the Smith Patent No. 1,933,349, and are well known in this art, so that the following brief description of operation is deemed sufficient. If the control perforation appearing at the upper brush station agrees with the control perforation appearing at the lower brush station for the same column of successive cards, both of the control magnet coils GCA and GCB are energized simultaneously, and due to the structure of the cooperating mechanism the associated control contact GC will not be opened. However, if the perforation appearing at the upper brush station does not agree with the perforation at the lower brush station, the control coils GCA and GCB will not be energized simultaneously, and when either of these coils is energized separately, the associated control contact GC is opened to cause a break in the control circuit, upon the opening of contacts F2, to deenergize the control magnet MCR. The circuit to maintain relay MCR energized when the control perforations agree and contacts GC remain closed is as follows: from conductor 464 to transferred contacts MCRc (it was described hereinabove how relay MCR is energized to effect transfer of the MCRc contacts and establish a holding circuit therefor through the said transferred contacts and F2), line 487, contacts GC, transferred contacts UCLc to lines 679 and 465. Upon deenergization of this magnet, the associated contacts MCRa, MCRb, and MCRc are restored to the normal positions shown in Fig. 14a. Therefore, upon closure of cam contacts L8 a circuit is completed to relays 44 and 45, which circuit was traced hereinabove.

*Printing operations.*—During the total cycle, the balance amount is printed numerically under control of the accumulator commutator devices shown in Fig. 14b and disclosed in detail in Patent 2,007,375. These devices are adapted to control printing so that the balance is represented in true numbers, irrespective of the fact that the balance number may be a positive amount representative of a credit balance, or a complemental amount, representative of a negative or debit balance. The devices cause the lowest accumulator order containing a significant digit to be complemented to ten, during readout operations, and all higher orders to be complemented to nine.

Upon energization of relay 45, a circuit is completed through the list magnet 24 when the 61a contacts and cam contacts L2 are closed, thereby causing the list clutch to be effective to render the printing mechanism operative during the cycle following the one during which the group change occurred to effect deenergization of relay MCR. It is remembered that the contacts 61a are closed at the times the lever 213 is positioned so that the ledger sheet feeding mechanism is rendered inoperative. Energization of relay 45 in turn causes relay 63 to be energized, and since these control circuits and following ones were traced in detail hereinbefore, it is not deemed necessary to repeat this description. It should be mentioned that the holding circuit for relay 63 is completed through contacts 63a, contacts 54a, and cam contacts R2. The relay 54 remains energized as long as the ledger sheet cooperates with lever 225 to close the associated contacts 226. Closure of contacts 63b completes a circuit through the relay coil 48, and it is remembered that energization of this relay causes relay 49 to be energized when cam contacts P2 are closed.

A parallel circuit is set up through contacts 48a as follows: line 464 to cam contacts P2, said contacts 48a, total control switch TCS, conductor 59A, balance control switch BS, through the balance accumulator read out mechanism. Now, in the event the accumulator contains a positive balance, no circuit is completed through the readout mechanism; however, if the accumulator contains a negative balance, a circuit is completed from the said switch BS to common conductor 114b to the "9" segment 115b of the highest order of the accumulator, conductor 60A, relay coil 50 to line 465. Upon energization of relay 50 the associated control contacts are operated so that the negative balance amount standing in the accumulator, when readout, will be printed in true figures rather than the complemental figures corresponding to the amount standing therein. The usual indicating mark is also printed adjacent to the printed total to indicate that the amount is a negative balance.

The manner in which a credit balance is printed under control of the emitter and commutator devices will first be explained. When the number in the accumulator is a true number, it is to be printed directly in the same form, and for this operation brushes 110 alone are utilized and a series of parallel circuits are completed therethrough in each order where the brushes 110 are positioned to represent a significant figure. An explanation of a single example will suffice to make the operation clear.

Assume that in the units order the brush 110 is set to represent a "4" as shown in dotted lines wherein it touches the "4" segment 112 and conductor 113 of the units order. The type bearing elements are moving past the printing position in synchronism with the movement of the emitter 650 so that as the "4" type reaches the printing position the emitter brush reaches the "4" segment, and a circuit is completed which is traceable as follows: from line 465, through emitter 650, "4" contacts 50a, "4" wire 54A, "4" segment 112 in the units order, brush 110, conductor 113, contacts 50c, contacts 49a now closed, plug socket 674, plug wire 675, socket 676, through print control magnet 36 to the line 464. Energization of the magnet at this time will intercept the associated type bar in position to print the numeral 4.

Contacts 49a are closed under control of relay 49 which is energized throughout the type selecting portion of the printing cycle through a circuit completed by closure of cam contacts P2. The circuit is from line 464, through contacts P2, contacts 48a, switch TCS, relay 49 and wire 679 to line 465.

When the accumulator holds a negative balance, it is represented by a complemental amount which is to be printed as a true number. For such operations both commutator brushes 110 and 111 are used, the former carrying a printing control impulse through a lower order, the commutator setting of which is to be complemented to ten, and the latter effecting control through higher orders which are complemented to nine.

Considering first the digits to be complemented to nine, it will be realized that in the highest order the brush 110 stand at "9" and brush 111 bridges segment 115b and conductor 114b causing the completion of a circuit traceable from line 464, through cam contact P2, contacts 48a, switch TCS, wire 59A, switch BS, conductor 114b, brush 111, segment 115b, wire 60A, magnet 50 and line 465. Energization of magnet 50 causes opening of contacts 50a and closure of contacts 50b. This action causes a reversal of the circuit connections between the wires connected to the emitter 650 and wires 54A in accordance with nines complementary arrangement. Impulses will, therefore, be emitted through the segments 112 and through conductors 113 in inverse order so that, as the "9" type elements are in printing position, the "0" segments and brushes 110 carry an impulse, and so on, until finally as the "1" type element reaches printing position, the "8" segments 112 receive an impulse.

Magnet 50 not only shifts contacts 50a and 50b for inverting the impulses directed through the higher orders, but it also shifts contacts 50d so that in the lowest order, should the order contain a significant digit, the brush 111 is selected to carry a tens complement reading through the conductor 114 instead of carrying the impulse selected by the nines complement brush 110. Other magnets 51 are provided to perform a similar function in the higher orders when they are selectively brought into action by related brushes 111 standing as positioned by accumulator wheels at "0." Each of these relays 51 is associated with related contacts 51b which may be closed for negative balance reading to invert lower order complement amounts to tens complements through brushes 111 so that a true number representation may be printed.

Whenever a negative balance is printed a minus sign is printed at the right of the numerical representation. This sign is printed under control of the sign printing magnet 36S. It is connected by a plug wire 700 to a wire 680 attached to the "0" line 54A which is of no effect when contacts 50a remain closed during the printing of a positive balance. However, upon the printing of a negative balance, relay 50 is energized and opens contacts 50a but closes contacts 50b so that wire 680 is then in effect connected to the 9's segment of the emitter 650. When the figures of the negative balance are printed, a "9" impulse then passes through wire 680, contacts 53d, one of the contacts 49a, plug connector 700, one of the contacts 53b and through the sign printing control magnet 36S to stop the related special type bar in position to print the sign referred to.

It was stated that during the printing operations, a magnetized code mark is recorded for automatic line finding purposes, upon reinsertion of the ledger sheet in the machine. The control circuit for effecting this operation is established at the time the type bars are positioned, by closure of cam contacts P6, and can be traced from line 464 to recording magnet 178 (Fig. 14c), cam contacts P6, and contacts 226 to line 465. The said cam contacts are closed for the duration of one point of the machine cycle, and therefore, the recording magnet is energized only momentarily to magnetize a discrete area opposite the said magnet. In this manner, the magnetized line finding mark 171 is recorded on the line receiving the printed indication of the new balance.

*Second ledger sheet feeding operations.*—Upon completion of the balance printing operations, the ledger sheet is fed to a common starting position, whereat it is halted momentarily, so that upon a subsequent feeding operation the same predetermined section of each ledger sheet is fed past the recording magnets in synchronism with the operation of the control elements of the machine. Before the recording of the magnetized index points can be effected a number of control circuits must be conditioned during the second ledger feeding operations, and will be described presently.

After the balance amount is printed, cam contacts P5 close, completing a circuit from line 464, to the clutch control magnet 204, said cam contacts P5, contacts 65b, and contacts 226 to line 465, energizing said magnet. The displaced controlling pin 208 is now restored to its normal retracted position to permit the ledger sheet feeding mechanism to be operated. The ledger sheet is then fed continuously to cause the leading edge of the sheet to actuate the sheet controlled lever 227, whereupon the associated contacts 228 are closed momentarily to complete a circuit through relay coil 60. Energization of this relay causes the associated contacts 60a and 60b to close and contacts 60c to open.

Closure of contacts 60a completes a circuit through magnet coils 203, which magnet, upon energization, causes one of the pins 208 in the pin drum 209 to be displaced. It was stated that a displaced pin engages the camming surface of lever 213, seven cycle points after displacement thereof, to position the said lever to effect engagement of the clutch elements 216 and 220, thereby causing the ledger sheet to be halted. In this manner the ledger sheet is fed seven line spaces, after the leading edge of the sheet caused one of the said pins to be displaced, before its travel is interrupted. When the ledger sheet is halted at this reference position, the leading edge of the ledger sheet is properly spaced from the balance recording magnets 179, so that upon the subsequent sheet feeding operation, the index point position of each ledger indicated in the section AS, will be fed past the said recording magnets in proper timed relationship with the control elements of the machine. Due to this provision the magnetized index points, representing the balance amount will always be formed at predetermined positions in the same section of each ledger sheet.

Closure of contacts 60b completes a circuit through the relay coil 59, energizing said relay, and causing the associated 59a contacts to transfer. The said relay is of the type known as a double step or impulse relay. It may be of the type shown in U. S. Patent 2,126,647 and comprises, essentially, a polygonal cam 59z fixed to a ratchet wheel 59y operated by the pawl 59x of the armature 59w of relay 59. The number of teeth of the ratchet wheel and the stroke of the pawl are such as to require a number of strokes of the pawl equal to twice the number of sides of the cam 59z, to cause one revolution of the cam. Thus, the first impulse initiated by contacts 60b causes the 59a contacts to transfer and remain transferred until the initiation of a second impulse.

Near the end of the total print cycle, cam contacts P7 were closed to complete a circuit through the relay coil 56, the said cam contacts, and contacts 226, energizing this relay, and causing its contacts 56a and 56b to close. A holding circuit was established therefore through contacts 56a and cam contacts F3. Closure of contacts 56b extended a circuit from line 464, through relay coil 53, contacts 56b to the lower one of contacts 59a, so that when the latter contacts are transferred, in the manner described above, the circuit is completed to line 465, energizing relay coil 53. Energization of relay 53 causes contacts 53b to open and 53c to close, and thereby causes the print magnets 36 to be disconnected from the readout circuits, and the recording magnets 179 to be connected thereto. Transfer of contacts 53d causes conductor 651 to be connected in circuit to the particular recording magnet 179 for recording the magnetized entry control index point. This described connection is effective to alter the timing of the impulse utilized during printing operations for energizing the minus sign print magnet, so that it is initiated one and a half cycle points before the initiation of the "9" recording impulses. It is recalled that this provision is made so that during the balance reading cycles one and a half cycle points are allowed for conditioning the balance accumulation prior to the entries of the recorded balance therein.

Now, after the ledger sheet is halted so that its leading edge is positioned properly at the reference position mentioned, the cam contacts L10 are closed, and due to the closure of contact 230, whenever the ledger sheet is not being advanced, the following control circuit is established: line 464 to magnet 204, relay coil 55, cam contacts L10, contacts 61d, contacts 56b, and transferred contacts 59a to line 465, energizing the said relay and magnet. Energization of relay 55 causes its contacts 55a to close and complete a circuit to the reset control magnet 162, energizing this magnet so that near the end of the following cycle, which is the balance code recording cycle, resetting of the various orders of the accumulator to zero positions is effected.

Energization of magnet 204 causes the displaced pin 208 to be restored to its retracted position, thereby permitting the ledger sheet feeding mechanism to be set in operation again to feed the ledger sheet past the recording magnets 179.

*Code recording operations.*—The machine is now conditioned for recording magnetically in code the new balance set up in the accumulator, and as the sheet is fed past the recording magnets 179, so that the index point positions are fed thereby in synchronism with the operation of the emitter 650, various circuits are completed through the read out device of the accumulator at differential times in accordance with the settings of the read out brushes to effect energization of the recording magnets 179. For recording magnetically a positive balance, a typical circuit can be traced as follows: line 464 to magnet 179, contacts 53c, plug wire connection 701, plug socket 674, contacts 49a, contacts 50c, conductor 113, brush 110, segment 112, contacts 50a, emitter 650 to line 465. In this manner the recording magnets 179 are energized at differential times during the part of the cycle that the said section AS of the ledger sheet is fed therepast. Upon energization of the said magnets, the areas on the sheet opposite the magnet pole pieces are magnetized by the magnetic fields set up by the energized magnets.

In the event, the accumulator holds a negative balance, the control circuits described in detail hereinabove, in connection with the printing operations, are established to effect energization of magnet 50, thereby causing a reversal of the circuit connections between the emitter conducting segments 650c and wires 54A, which are connected to conducting segments 112 of the read out device. Impulses will therefore be emitted through the segments 112 and through conductors 113 in inverse order so that the magnetic balance recording will be effected in a code representing the true number.

It was mentioned hereinabove that upon transfer of the contacts 53d the conductor 651 is connected in circuit to the particular recording magnet 179 for recording the magnetized entry control index point. The initiation of this controlling impulse is controlled by the closure of cam contacts L7, which close one and a half index points before the "9" index point position. At this time in the machine cycle the circuit is completed from line 464 to the said particular recording magnet 179, contacts 53c, plug wire connection to contacts 49a, and transferred contacts 53d, conductor 651, contacts 50e, cam contacts L7 to line 465, energizing this magnet. Due to the energization of the said recording magnet the entry control index point 172a is recorded magnetically on the ledger sheet one and a half cycle points before the "9" index points are recorded.

The feeding of the ledger sheet is continued so that the top or trailing edge thereof passes the lever 227, permitting it to close momentarily the contacts 228. Closure of these contacts cause the relay 60 to be energized to close contacts 60a and 60b. Closure of contacts 60a completes the shunt circuit described hereinabove, to magnet 203, causing one of the pins 208 of pin drum 209 to be displaced, thereby causing the ledger sheet feeding mechanism to be rendered inoperative, after effecting the feeding of seven more line spaces of the sheet. Closure of contacts 60b causes the energization of relay 59, and thereby restores the transferred 59a contacts to the normal position shown in Fig. 14c. The ledger sheet is now positioned to a point where it can be withdrawn manually from the last pair of feed rollers 201, or if desired can be ejected automatically under control of the said feed rollers upon insertion of the next ledger sheet and initiation of the ledger sheet feeding operations.

*Special ledger sheet feeding operations.*—In the event a blank ledger sheet is inserted in the machine, one which contains no previous balances printed or recorded magnetically thereon, it is evident that no automatic line finding operations of the type described hereinabove will take place. For such cases, additional control means must be provided to automatically position the ledger sheet at the printing station so that the data is printed in the first line space on the sheet. It was mentioned in the description of the ledger sheet, that its length is such that when the leading edge is positioned at the reference position mentioned hereinbefore, that is the leading edge of the sheet is positioned just up to the recording magnets 179, but not under these magnets, the first line space of the sheet is presented to the printing station.

Now, upon insertion of the ledger sheet in the machine, after the machine is conditioned for ledger sheet operations as described hereinabove, and upon depression of the start key, the ledger sheet mechanism is rendered operative as described to effect feeding of the sheet through the machine. Since no line finding mark 171 is formed on the sheet, the usual control is not exercised over the sheet feeding mechanism. In such cases the sheet feeding mechanism remains operative to feed the sheet so that the leading edge actuates the sheet controlled lever 227 to effect momentary closure of contacts 228. Closure of said contacts causes the energization of relay 60. Closure of contacts 60a completes a shunt circuit, around contacts LFRa to magnet 203, energizing said magnet, and thereby causing one of the pins 208 of the pin drum 209 to be displaced. It is remembered that upon displacement of the said pin, the ledger sheet is fed an additional seven line spaces before the displaced pin is effective to render the sheet feeding mechanism inoperative. The first line space of the sheet is now properly positioned for receiving the new printed balance, and the leading edge of the sheet is properly positioned with respect to the balance recording magnets 179 for receiving the recording of balance code marks upon the next ledger sheet feeding operation. Therefore, the operation described hereinabove for feeding the ledger sheet, after receiving the printed data, to the reference position is not required. This operation, it is recalled, is under control of the cam contacts P5. However, during the present operations described, these cam contacts are ineffective to establish any controlling circuits since the contacts 65b are open. It is recalled that the energization of relay 65 is under control of contacts LFRb, and these contacts can only be closed by energization of the relay LFR, which in turn is energized only upon the sensing of the magnetized line finding index point.

Therefore, upon completion of the printing operations, in the manner described hereinabove, the ledger sheet feeding operations are renewed under control of the P7 cam contacts which are closed near the end of the total print cycle to complete a circuit to relay 56, energizing said relay. The holding circuit therefore is established through contacts 56a and cam contacts F3 as described. Now, upon closure of contacts 56b, and cam contacts L10, a circuit is completed from line 464 to magnet coils 204, relay coil 55, cam contacts L10, contacts 61d, contacts 56b and transferred contacts 59a to line 465, energizing said magnet and relay. Energization of magnet 204 causes the ledger sheet feeding mechanism to function to feed the sheet past the recording magnets 179 to receive the magnetic recordings in code of the new balance, which operations were just described in detail. Closure of the 55a contacts causes the reset magnet 162 to be energized to reset the accumulator as explained.

The present application claims the subject matter disclosed herein relating to deriving new balances and printing and recording in code these new balances, said code recordings being adapted to be obliterated and replaced by still other recordings.

The subject matter disclosed herein relating to the automatic positioning of the ledger sheet, and the control elements for effecting this selective positioning is claimed in a co-pending application Serial No. 397,846, filed June 13, 1941.

While there have been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention therefore, to be limited only as indicated by the scope of the following claims.

What is claimed is:

1. In a machine controlled by detail records, for keeping ledger accounts on ledger sheets bearing magnetizable matter, the record on the ledger sheets including a printed record and a magnetic code record of the old balance, sensing means for sensing said magnetic code record, means including an obliterating magnet for obliterating magnetic code records, means for continuously feeding a ledger sheet past said sensing means and said obliterating magnet, in the order mentioned, to effect sensing of the magnetic record of the old balance and then obliteration thereof; an accumulator having entry means and readout means, means for connecting said entry means to said sensing means so as to cause the old balance to be entered in the accumulator, means for sensing the data designations of successive detail records, means for successively feeding detail records to the said detail record sensing means, control elements causing the detail record feeding means to be rendered operative upon completion of the sensing of the ledger sheet magnetic record, means connecting the detail record sensing means to said entry means to effect entries of the detail amounts in the accumulator, additional control means under control of the detail record sensing means for rendering the detail record feeding means inoperative after sensing a group of detail records, printing means to which the ledger sheet is fed by the action of said feeding means, after completion of the sensing of said magnetic code record; means controlled by said additional control means for rendering said readout means effective to control said printing means, to effect the printing of the balance amount standing in the accumulator, on the ledger sheet; magnets for recording magnetic code marks, means under control of said printing means for causing said ledger sheet feeding means to resume feeding operations, upon completion of the balance printing, to feed the ledger sheet past the said recording magnets; and means also under control of the printing means for rendering the readout means effective to energize the said recording magnets, to make a magnetic record of the new balance on the ledger sheet.

2. In a machine controlled by detail records bearing data designations, for keeping ledger accounts on ledger sheets in a form including both a printed record of the old balance on a print receiving area and a magnetic code record of the old balance, on a magnetic record area having magnetizable matter therein; sensing means for sensing said magnetic code record, means including an obliterating magnet for obliterating magnetic code records, means for continuously feeding a ledger sheet past said sensing means and said obliterating magnet, in the order mentioned, to effect sensing of the magnetic record of the old balance and then obliteration thereof; an accumulator having entry means and readout means, means for connecting said entry means to said sensing means so as to cause the old balance to be entered in the accumulator, printing means to which said print receiving area of the ledger sheet is presented by the action of said sheet feeding means, after completion of the sensing of said magnetic code record, means to stop said ledger sheet feeding means when a clear line of said print receiving area is presented to said printing means, means for sensing the data designations on successive detail records, means for successively feeding detail records to the said detail record sensing means, control elements causing the detail record feeding means to be rendered operative upon completion of the sensing of the ledger sheet magnetic record, means connecting the detail record sensing means to said entry means to effect entries of the detail amounts in the accumulator, additional control means under control of the detail record sensing means for rendering the detail record feeding means inoperative after sensing a group of detail records, means controlled by said additional control means for rendering said readout means effective to control said printing means, for effecting the printing of the balance amount standing in the accumulator in said clear line of the print receiving area of the ledger sheet, magnets for recording magnetic code marks, means under control of said printing means for causing said ledger sheet feeding means to resume feeding operations, upon completion of the balance printing, to feed the ledger sheet past the said recording magnets; and means also under control of the printing means for rendering the readout means effective to energize the said recording magnets, when said magnetic record area of the ledger sheet is presented thereto, to make a magnetic code record of the new balance on the ledger sheet.

3. In a machine for keeping ledger accounts on ledger sheets in a form including both a permanent record and a sensible, effaceable record of the old balance, recording means for making said permanent record and recording means for making said effaceable record, on the ledger sheet; means to sense the effaceable record on the ledger sheet, means to efface said effaceable record from the record sheet, means to feed the ledger sheet first to said sensing means, then to said effacing means, and then, in succession, to each of said recording means; an accumulator comprising entry means and readout means, means whereby said entry means is controlled by said sensing means to enter the old balance in said accumulator; means to operate said entry means to accumulate detail amounts with said old balance in said accumulator, to form a new balance therein; and means to operate said recording means in succession, under control of said readout means, each at the time the ledger sheet is fed thereto by said ledger sheet feeding means, to make both a permanent record and a sensible, effaceable record of the new balance on the ledger sheet, the feeding of the ledger sheet to said effaceable record recording means being controlled so that the effaceable record of the new balance is made on the same area of the ledger sheet from which the old balance was effaced.

4. In a machine for keeping ledger accounts on ledger sheets in a form including both a permanent record and a sensible, effaceable record of the old balance, with which are to be accumulated new amounts from detail records; recording means for making said permanent record and recording means for making said effaceable record, on the ledger sheet; means for sensing said effaceable record on the ledger sheet, means to efface said effaceable record from the ledger sheet, means to feed the ledger sheet first past said sensing means, then past said effacing means, and then, in succession, to each of said recording means; an accumulator comprising entry means and readout means, means whereby said entry means is controlled by said sensing means as the ledger sheet moves past the latter, to enter the old balance in said acculator; detail record sensing means and means whereby said entry means is controlled thereby to accumulate detail amounts with the old balance in said accumulator, to form a new balance therein; control means for starting said ledger sheet feeding means to feed the ledger sheet past its sensing means, control means for starting said detail record sensing means, and means including a single manipulative device for energizing said two control means in response to one operation of said manipulative device, said second mentioned control means including means to delay the effective operation of the detail record sensing means until the entry of the old balance has been completed; means to operate said permanent record making means under control of said readout means to record the new balance on the ledger sheet as a permanent record, and means to operate said effaceable record making means under control of said readout means to record the new balance on the ledger sheet as a sensible, effaceable record.

5. In a machine for keeping ledger accounts on ledger sheets in a form including both a printed record and a sensible, effaceable record of the old balance, printing means for making said printed record and recording means for making said effaceable record on the ledger sheet, means for sensing said effaceable record on the ledger sheet, means to efface said effaceable record from th ledger sheet, means to feed the ledger sheet in succession to said sensing means then to said effacing means, then to said printing means, and then to said recording means; an accumulator comprising entry means and readout means, means whereby said entry means is controlled by said sensing means to enter the old balance in said accumulator, means to control the entry means to enter detail amounts with said old balance in said accumulator, to form a new balance therein; means to operate said printing means under control of said readout means to record a new balance on the record sheet as a printed record, and control means set in operation by said printing means to cause the feed of the ledger sheet by said feeding means to said recording means and to transfer the control of said readout means to said recording means, whereby the new balance is also recorded on the ledger sheet as a sensible, effaceable record.

6. In a machine for keeping ledger accounts on ledger sheets bearing magnetizable material, on which ledger sheets the old balance is kept as a printed record and as a magnetic code record, printing means, magnetic recording means, means for feeding a ledger sheet to said printing means and then to said magnetic recording means, means to sense the magnetic record of the old balance on a ledger sheet as it is fed toward said printing means, means to obliterate said magnetic record of the old balance as the sheet passes from said sensing means to said printing means, an accumulator comprising entry means and readout means, means whereby said entry means is controlled by said sensing means to enter the old balance in said accumulator, means to operate said entry means to accumulate detail amounts with said old balance in said accumulator, to form a new balance therein; means to interrupt the feed of the ledger sheet by said feeding means when a particular line thereof is presented to said printing means; means to operate said printing means under control of said readout means, to print the new balance on said particular line; means including cyclically operating means to energize said magnetic recording means, under control of said readout means, at differential times in the cycle, and means to operate said sheet feeding means to feed the ledger sheet past said magnetic recording means in synchronism with said energizing means to make a magnetic code record of the old balance, composed of magnetic spots representing different values by their differential positions on the sheet.

7. In a machine for keeping ledger accounts on ledger sheets in a form including both a printed record and a sensible, effaceable record of the old balance, printing means for making said printed record and recording means for making said effaceable record on the ledger sheet, means for sensing said effaceable record on the ledger sheet, means to efface said effaceable record from the ledger sheet, means to feed the ledger sheet in succession to said sensing means then to said effacing means, then to said printing means, and then to said recording means; an accumulator comprising entry means and readout means, means whereby said entry means is controlled by said sensing means to enter the old balance in said accumulator, means to control the entry means to enter detail amounts with said old balance in said accumulator, to form a new balance therein; means to operate said printing means under control of said readout means to record a new balance on the record sheet as a printed record, means to operate said recording means under control of said readout means, and means to coordinate the feed of the ledger sheet by said feeding means to the operating means of said recording means so as to present to said recording means, during its operation, the same area of the ledger sheet from which the effaceable record of the old balance was effaced.

JAMES W. BRYCE.